United States Patent [19]
Fletcher et al.

[11] 3,717,379
[45] Feb. 20, 1973

[54] APPARATUS FOR CUTTING AND SPLITTING MINERAL BODIES AND OTHER MATERIALS

[75] Inventors: Ralph A. Fletcher, Bedford, N.H.; Joseph R. Oliver, Lowell, Mass.

[73] Assignee: H. E. Fletcher Co., Westford, Mass.

[22] Filed: April 19, 1971

[21] Appl. No.: 134,975

Related U.S. Application Data

[62] Division of Ser. No. 2,489, Jan. 13, 1970, Pat. No. 3,655,243.

[52] U.S. Cl....................299/22, 125/23 R, 173/52
[51] Int. Cl...............................................E21c 37/02
[58] Field of Search..........................299/15, 21–23, 299/13; 125/23 R; 173/52

[56] References Cited

UNITED STATES PATENTS

| | | | |
|---|---|---|---|
| 3,511,538 | 5/1970 | Guenter | 299/13 |
| 3,321,032 | 5/1967 | Jensen et al. | 173/52 |

*Primary Examiner*—Ernest R. Purser
*Attorney*—Munroe H. Hamilton

[57] ABSTRACT

Multiple tool means for working a material are mounted in a tool-supporting structure. The tool-supporting structure, at one side, is formed with an elongated tool opening to provide for movement of a gang of tools therethrough into and out of engagement with a surface and the body of the material. Each of the tools in the gang may thereafter be selectively actuated. Where desired, greater versatility is realized by mounting additional reciprocating tools in spaced relation around a frame which revolves through an extended arc of travel. Indexing movement of the revolving frame permits any of the tools to be located so as to be advanced and retracted through the said opening of the tool-supporting structure in various positions of angularity along the extended arc of travel.

In one desirable form of tool means, multiple wedging forces are exerted to split minerals and other bodies along extended planes of splitting. Specifically the wedging forces may be applied to a mineral body such as granite as it occurs in a natural state, and from which pieces of dimensioned stone may be produced. Controlled splitting is accomplished by a gang of spaced, reciprocating wedge devices together with fluid power-actuated driver means for transmitting driving forces to each of the wedge devices. The wedge devices may be operated simultaneously or separately of one another and the driving forces may be exerted to reach a maximum intensity instantly or applied with gradually increasing intensity.

Application of wedging forces may also be preceded by tracing a line of splitting in a rock body and drilling spaced holes along the traced line, and the gang splitting apparatus may further include tracing and drilling means received therewithin. In the rock-splitting apparatus, a revolving frame with attached tools is supported in a frame-supporting structure which is particularly designed for locating the frame in close proximity to a work surface of stone or other material. The frame-supporting structure and revolving frame with tools comprise a mobile unit particularly suitable for location against a vertical surface of a mineral body but also applicable to a horizontally disposed work surface or any other disposition of work surface, and in any of these applications, the frame support and frame may be oriented in varying positions of angularity.

13 Claims, 52 Drawing Figures

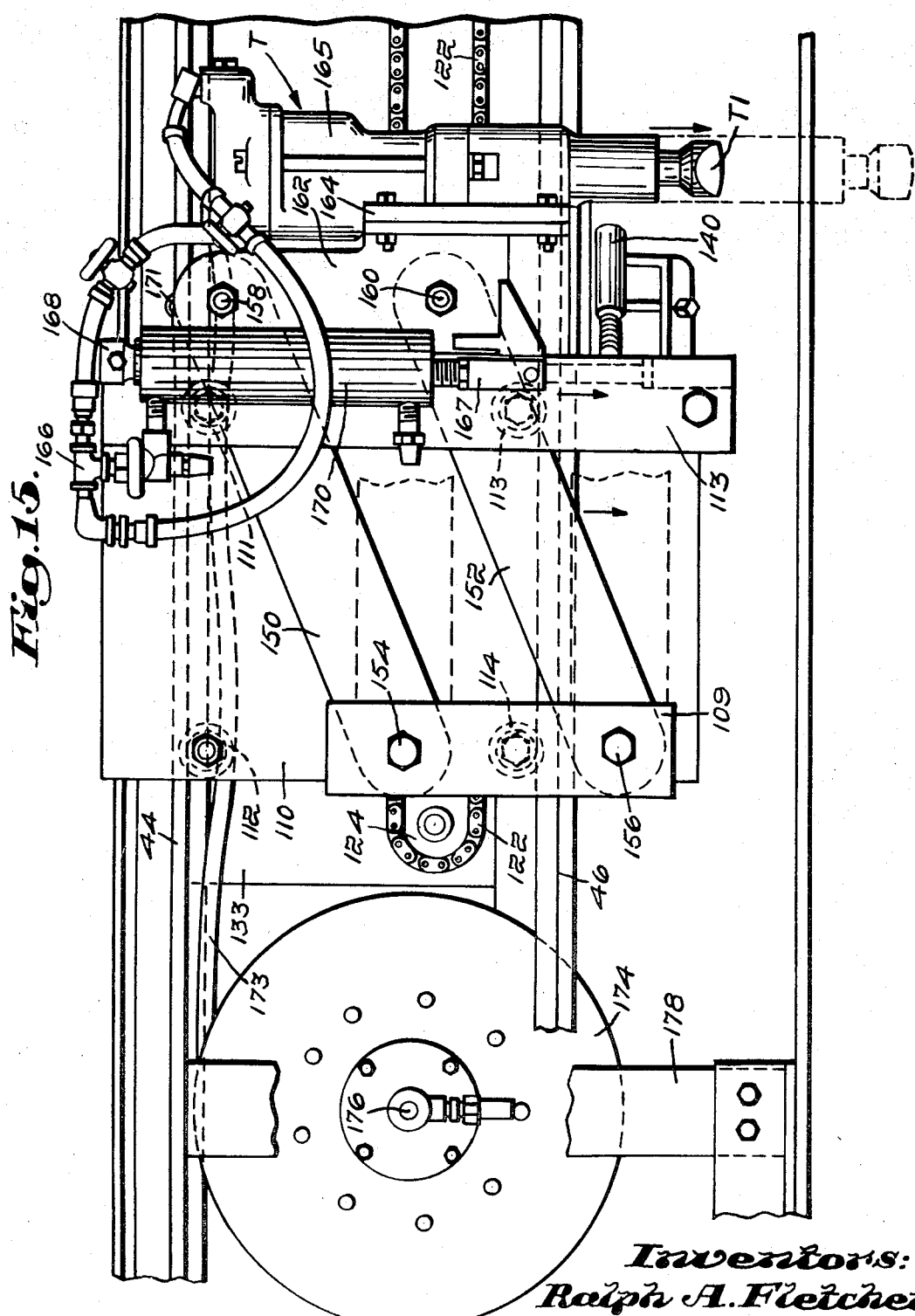

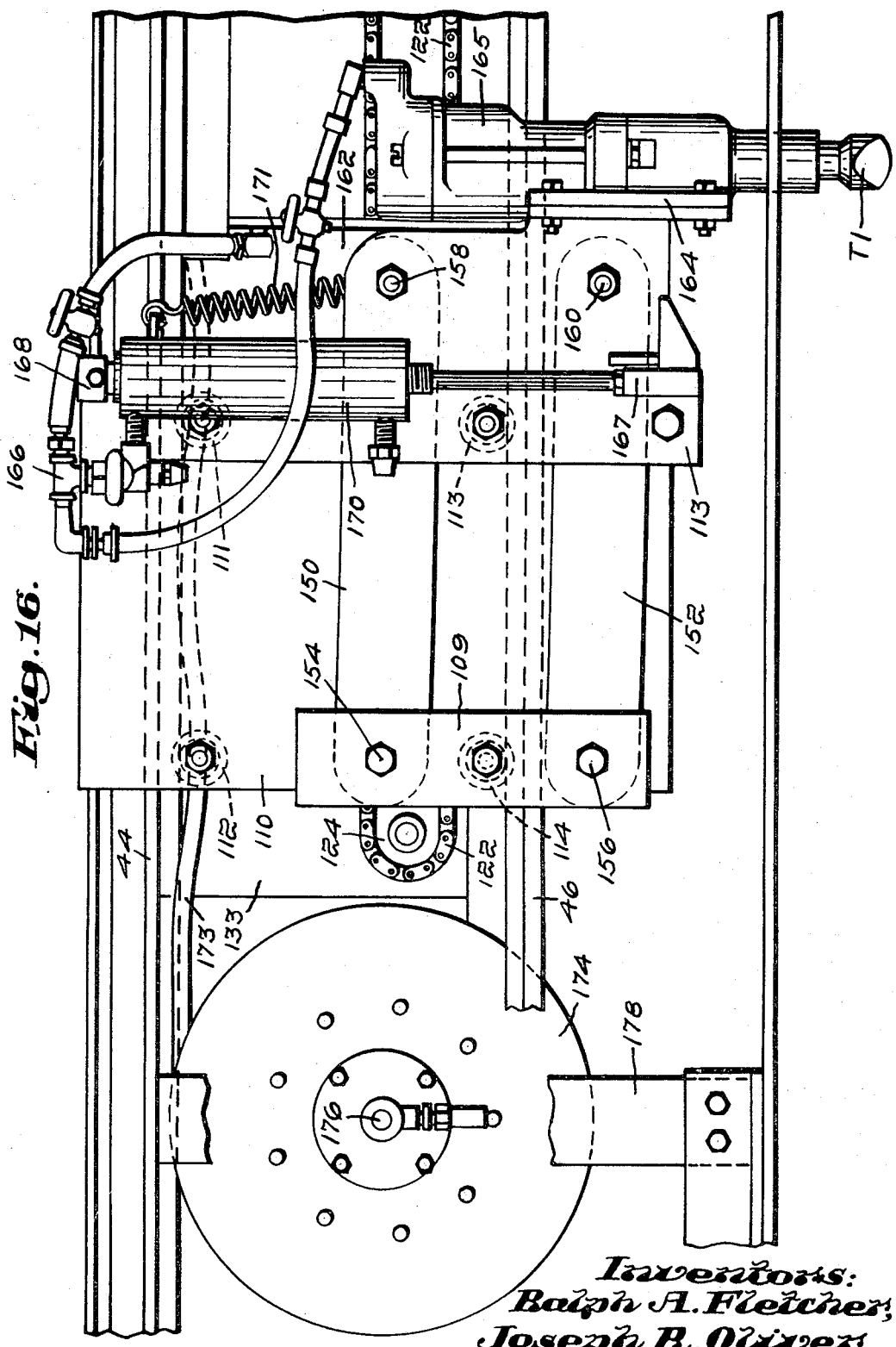

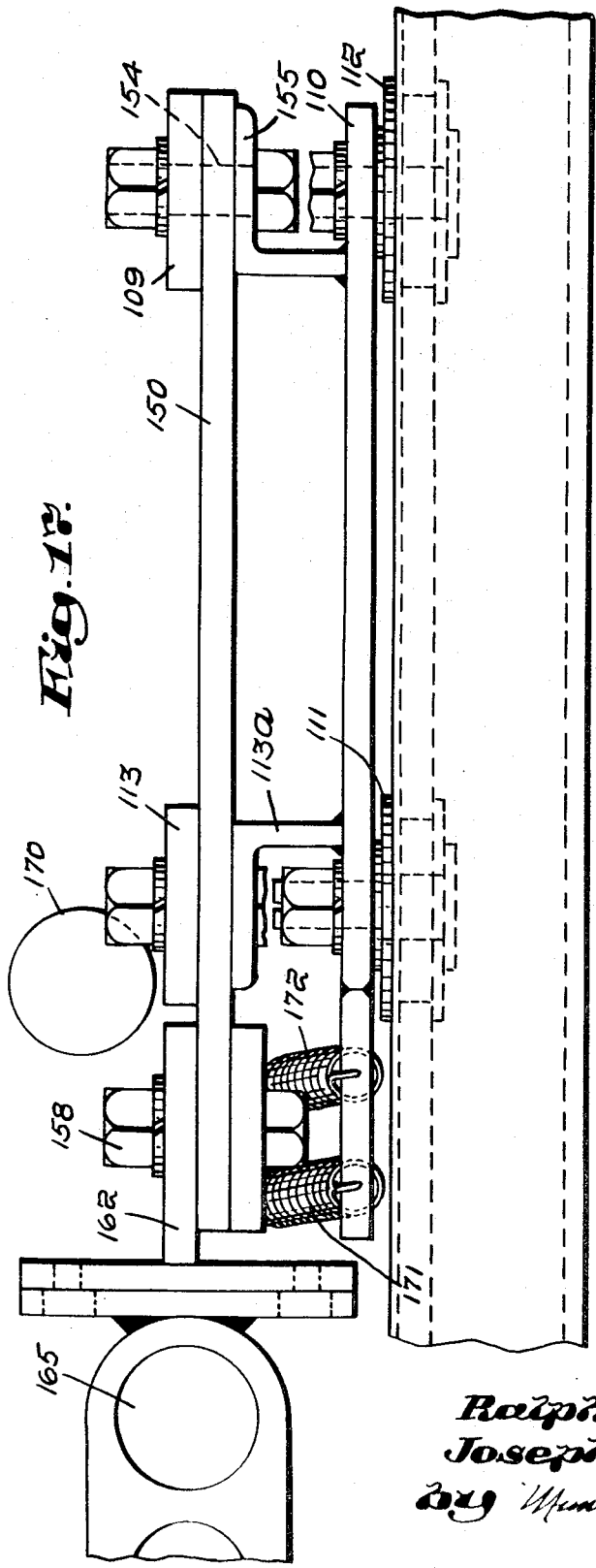

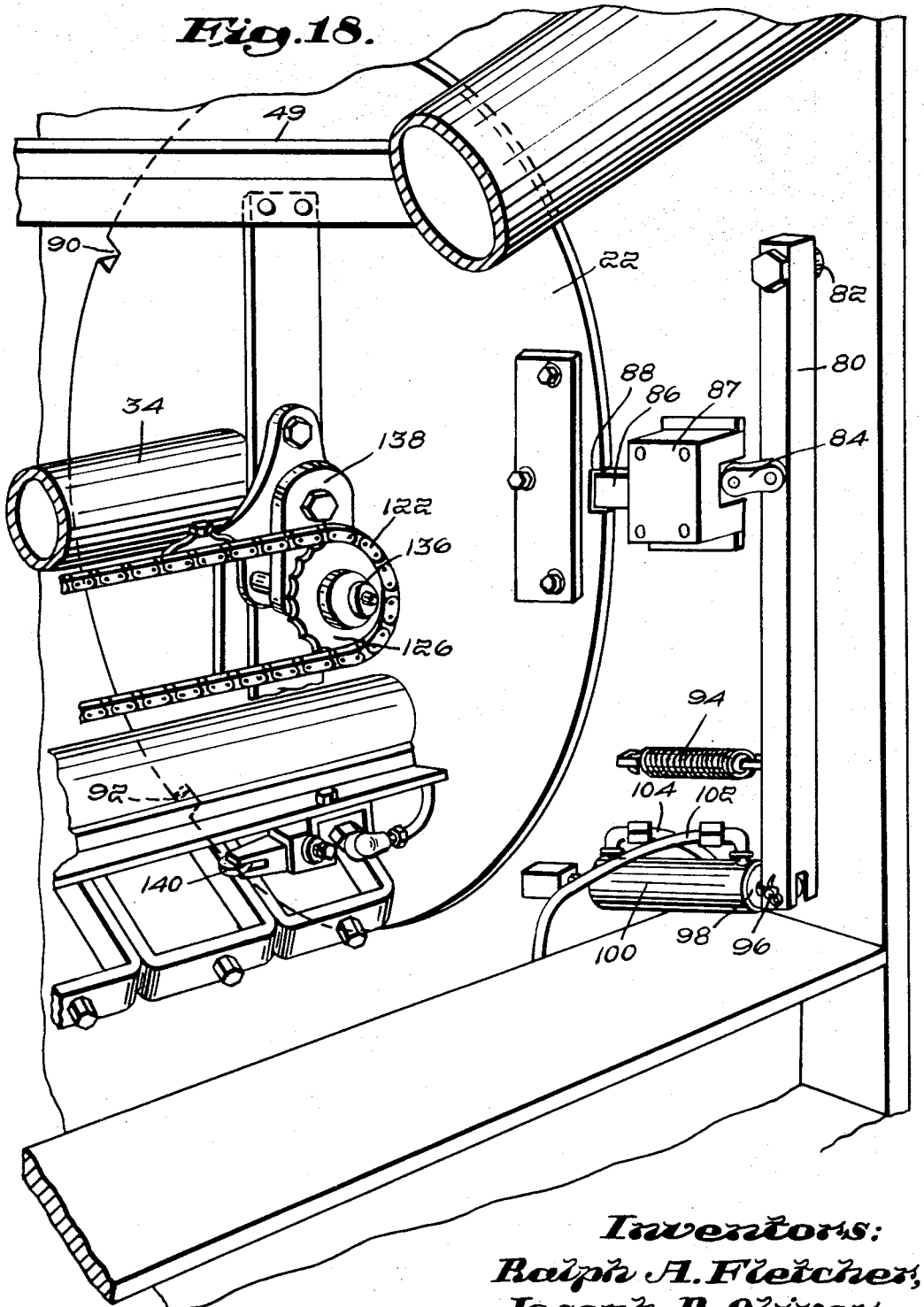

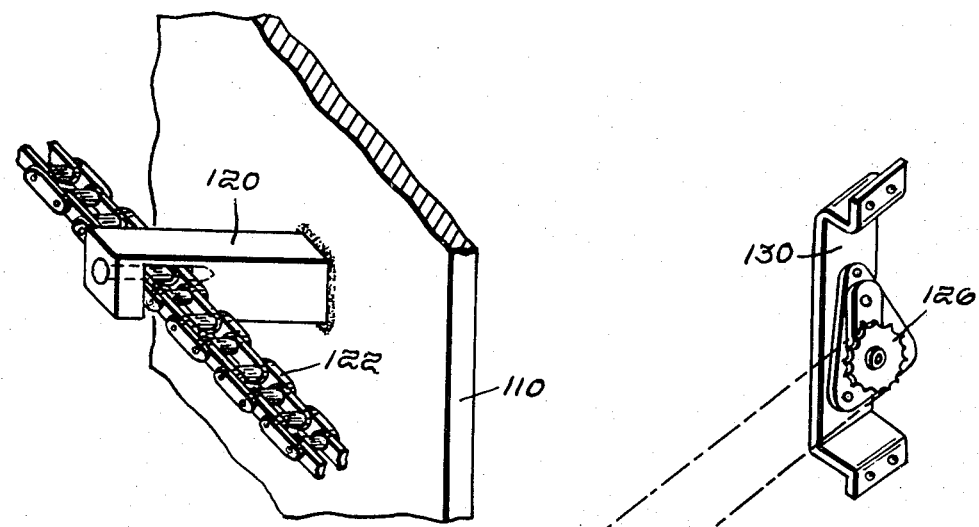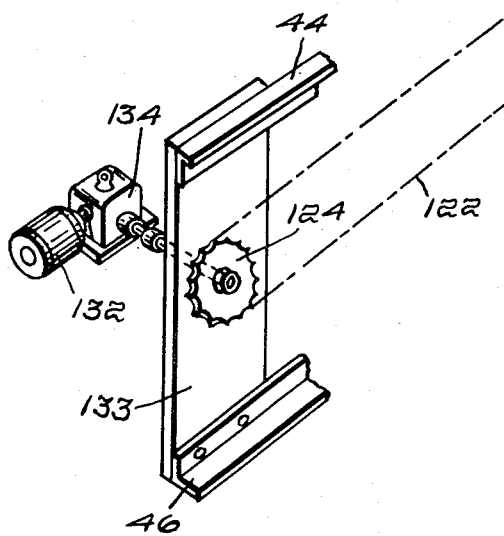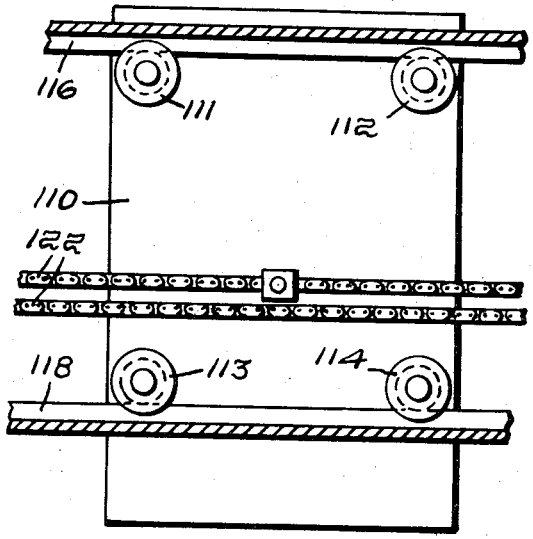

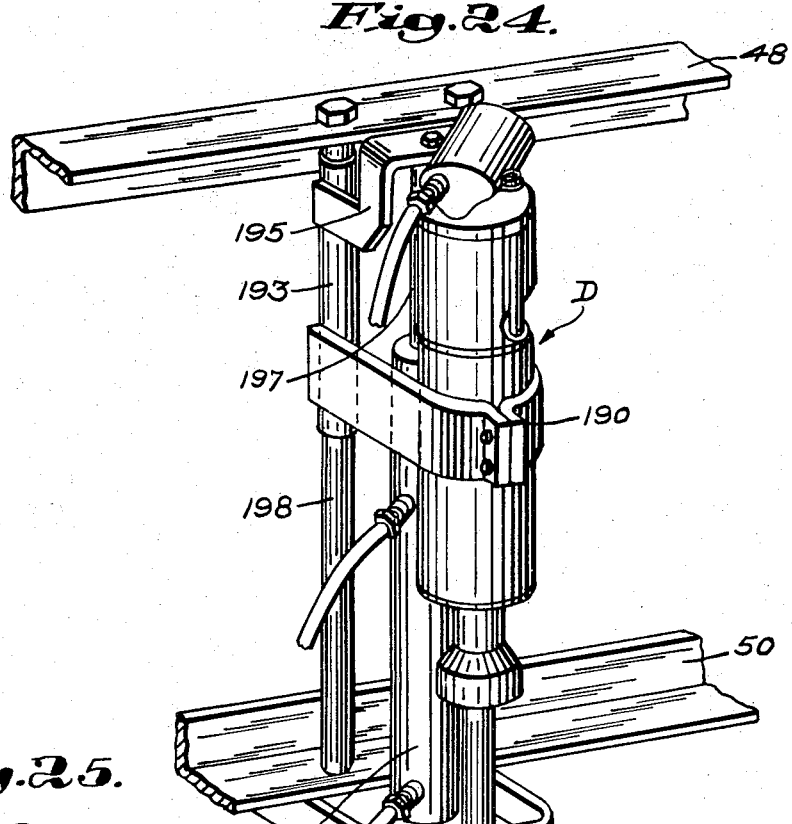
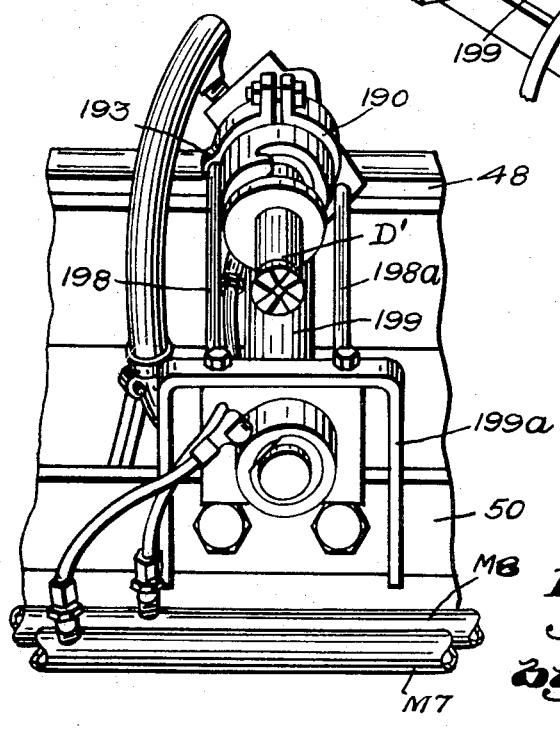

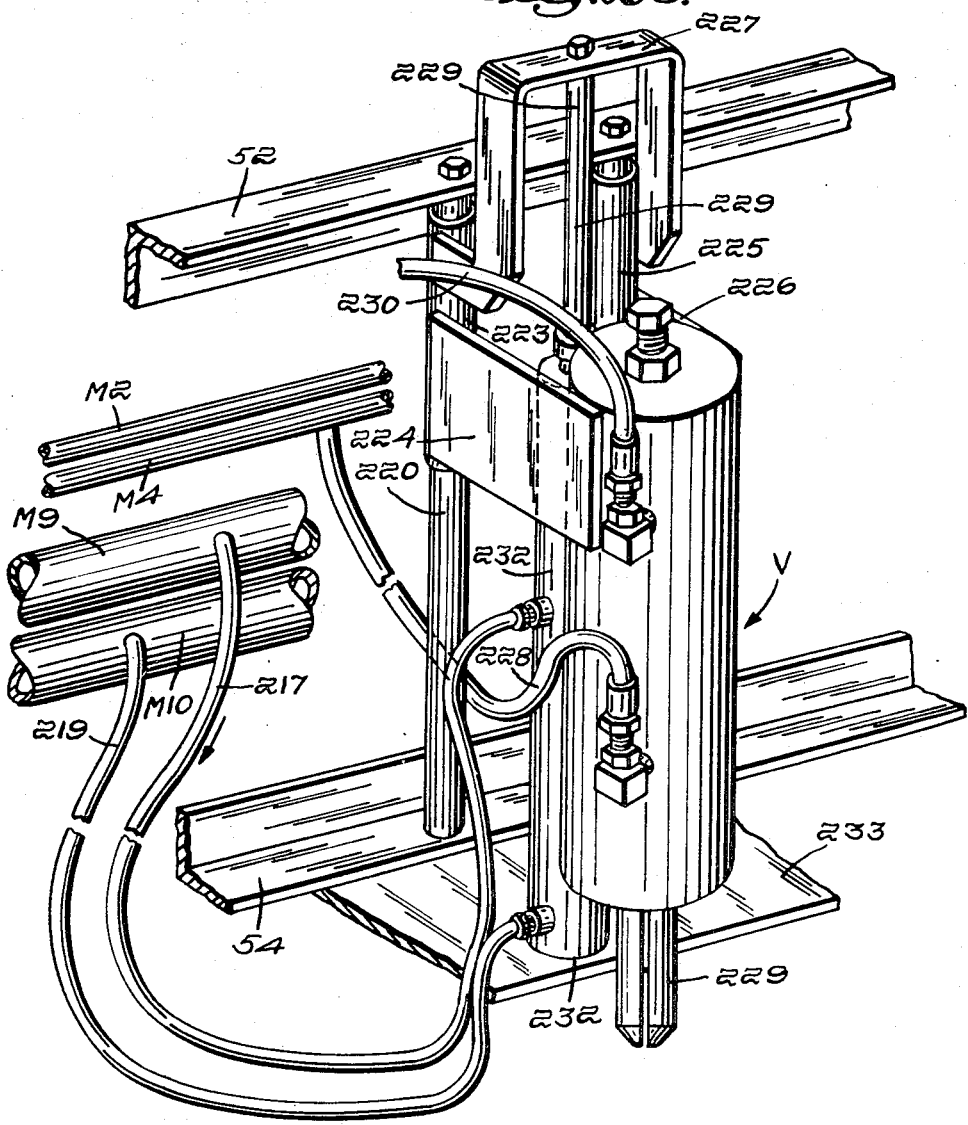

Inventors:
Ralph A. Fletcher,
Joseph R. Oliver,
by Munos A. Hanitta
Attorney

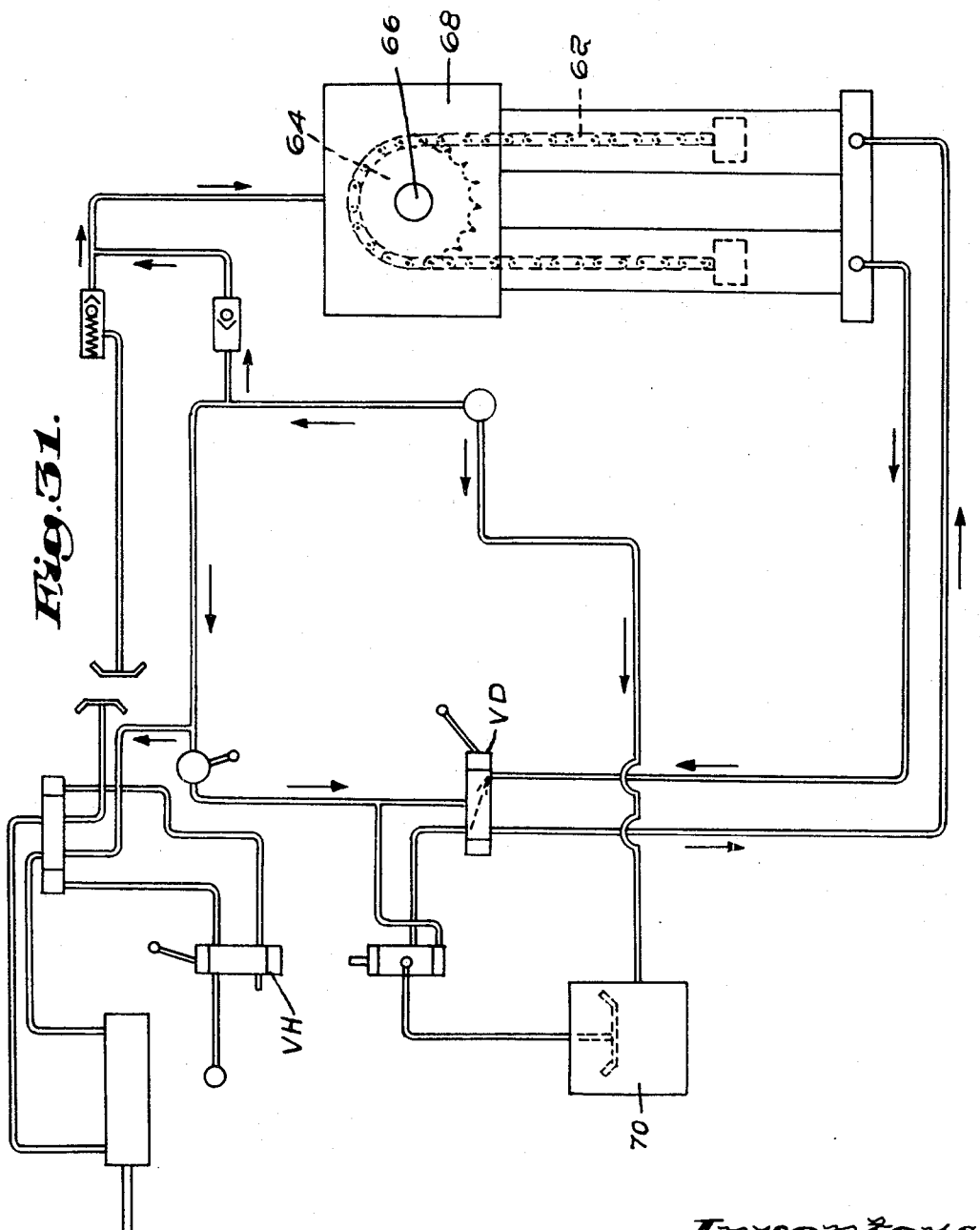

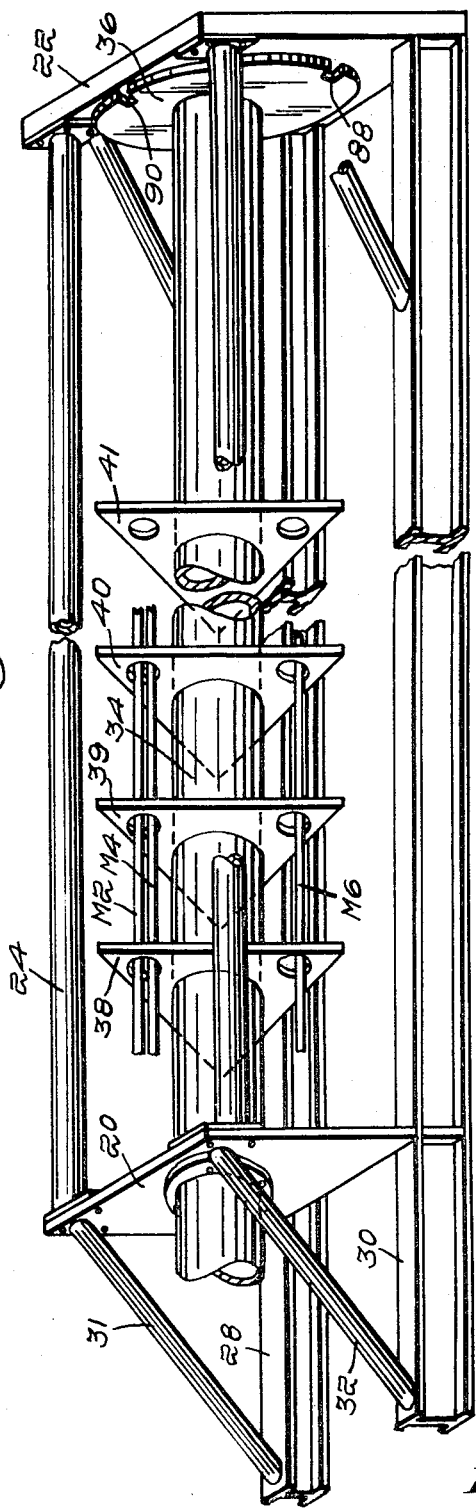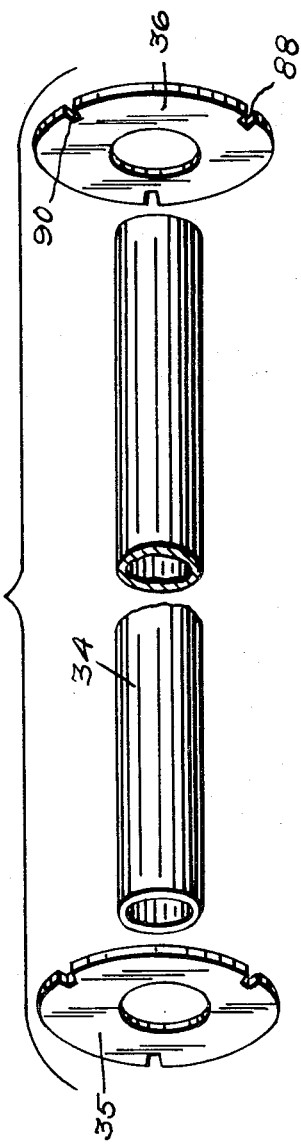

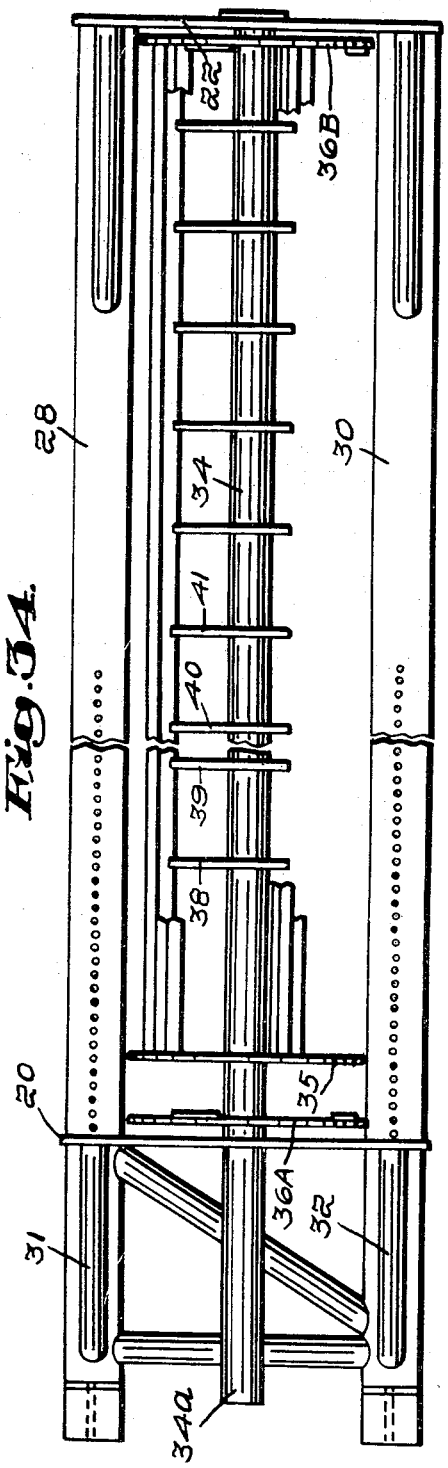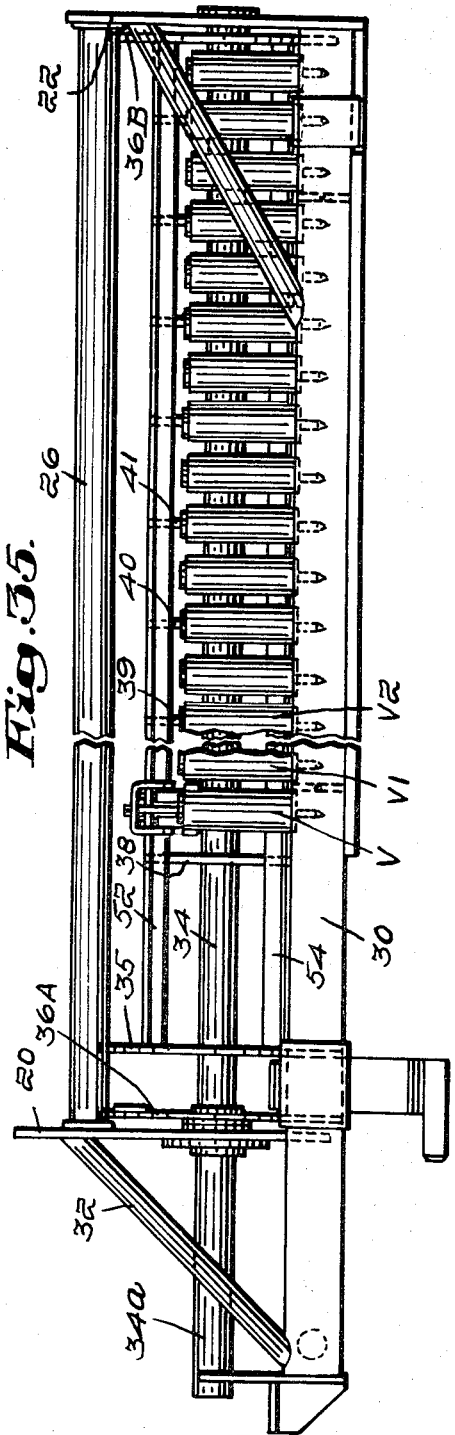

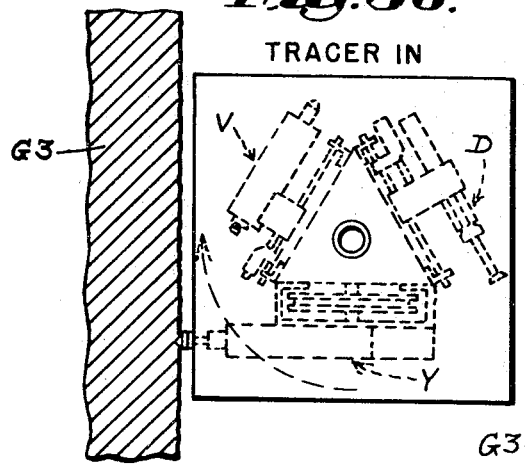
Fig. 36. TRACER IN
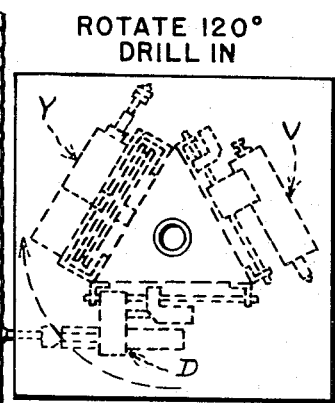
Fig. 37. ROTATE 120° DRILL IN
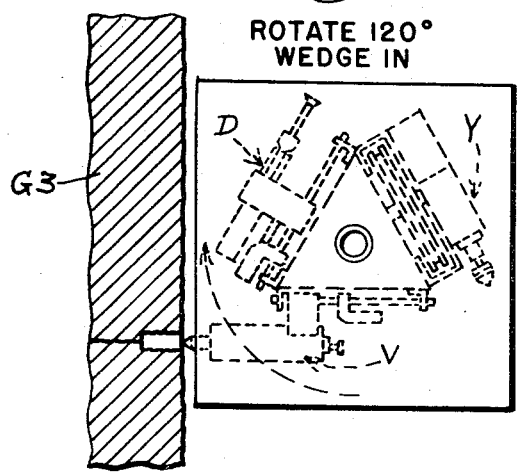
Fig. 38. ROTATE 120° WEDGE IN
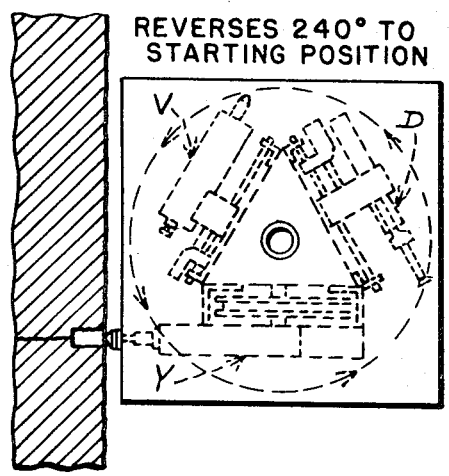
Fig. 39. REVERSES 240° TO STARTING POSITION
Inventors:
Ralph A. Fletcher,
Joseph R. Oliver,
by Munroe H. Hamilton
Attorney

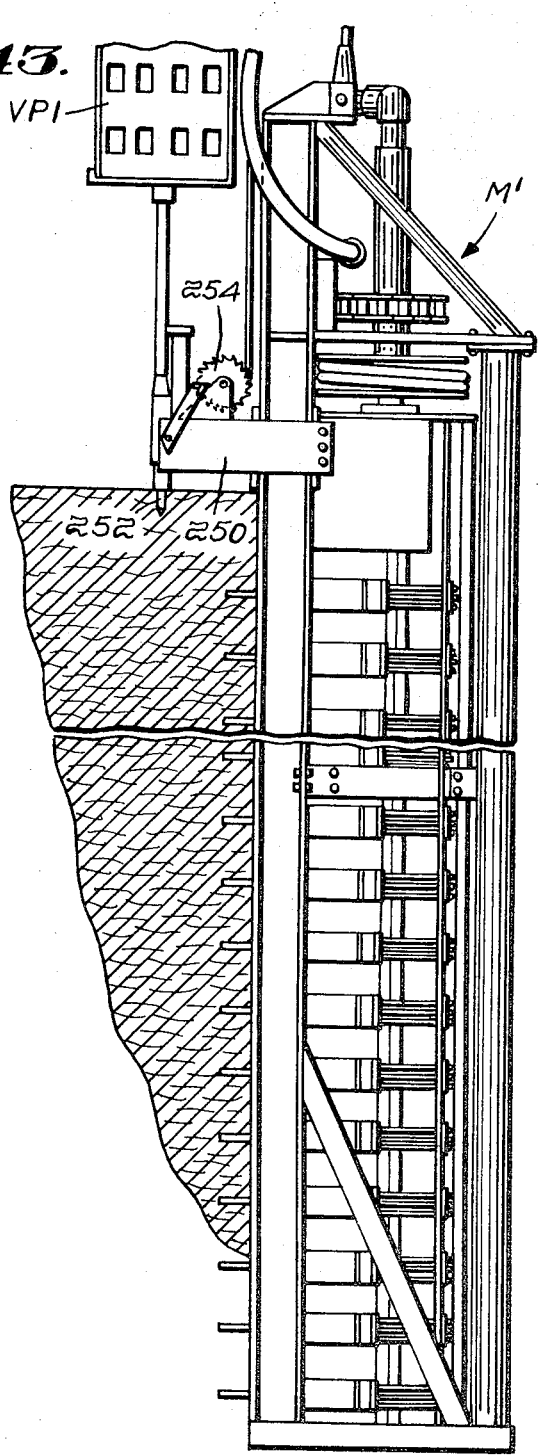

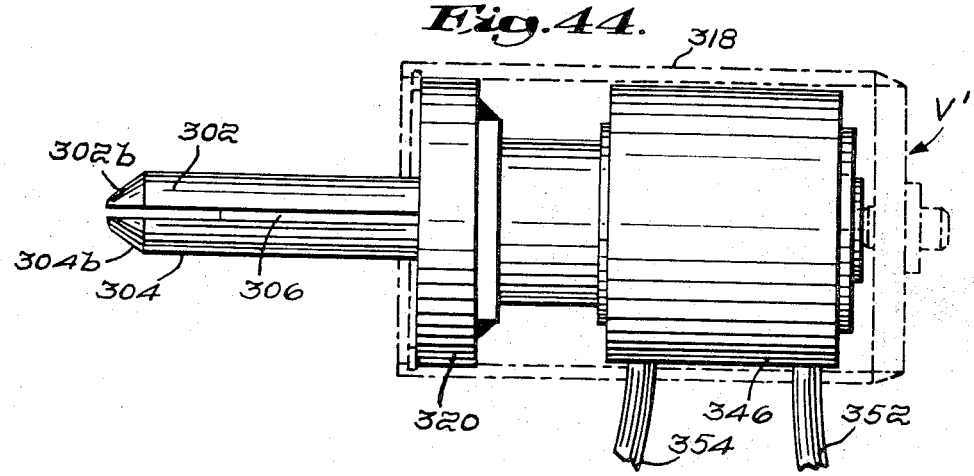
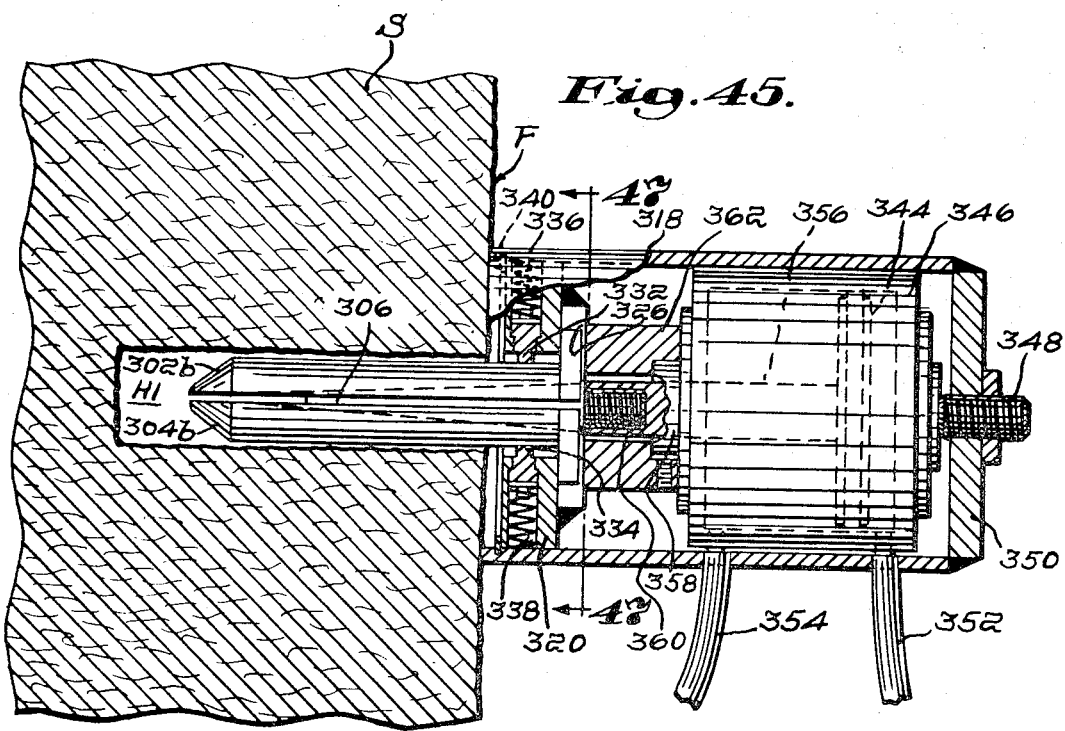
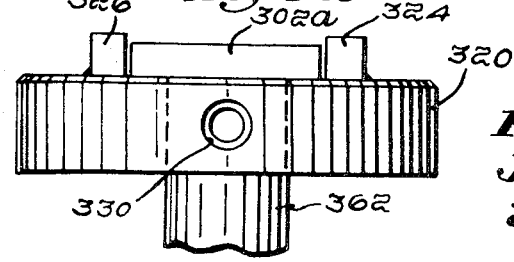

Inventors:
Ralph A. Fletcher,
Joseph R. Oliver,
by Munro H. Hamilton
Attorney

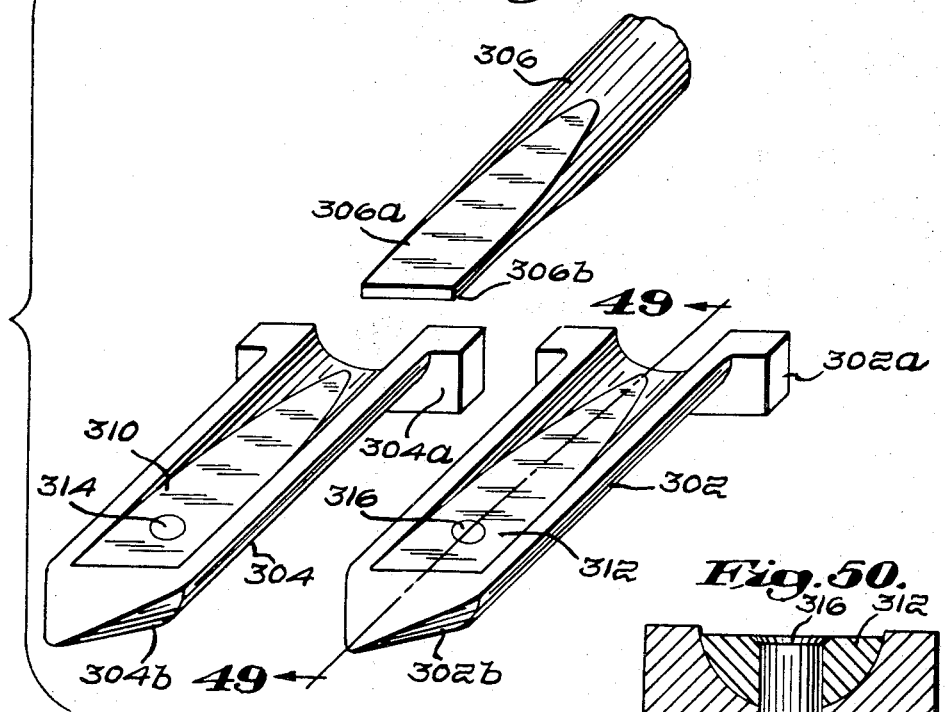
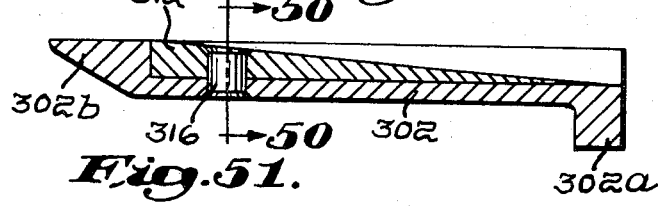
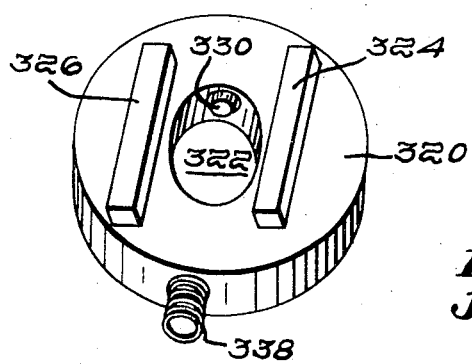

APPARATUS FOR CUTTING AND SPLITTING MINERAL BODIES AND OTHER MATERIALS

This application is a continuation-in-part of our copending application, Ser. No. 793,348 filed Jan. 23, 1969 and now Pat. No. 3,655,243 for METHOD AND MEANS FOR APPLYING WEDGING FORCES TO MINERALS AND OTHER BODIES.

This invention relates broadly to methods and means for working material wherein a multiple tool apparatus is employed, either as a mobile unit to be transported to a work area, or as a stationary unit for processing work pieces moved by suitable conveying equipment. In a more specific aspect, the invention is concerned with a method and apparatus for producing dimension stone by applying multiple wedging forces in a body of granite. Reference is had especially to a block of granite which has been freed from the ledge as it occurs in a natural state in a granite quarry. The multiple wedging forces may be selectively controlled in order to separate stone sections from the block so that the stone sections may then be split to meet requirements for desired dimension stone sizes.

Various methods for using wedging devices have been utilized in the production of dimension stone, and problems arise in applying wedging forces. For example, conventional wedging methods are slow and expensive and are particularly subject to the disadvantage that they result in stone sections which frequently split along irregular planes. When this occurs some portions of the stone cannot be used and a very substantial waste factor is continuously experienced. This results in substantially increasing the final product cost.

In attempting to utilize wedging devices in granite, it is necessary to work along an exposed surface of freed stone. This is true regardless of whether a desired plane of splitting is to extend inwardly from an exposed vertical surface or downwardly from an exposed horizontal surface. If splitting is to progress from an exposed vertical surface inwardly, then difficulty is experienced in driving and handling wedge devices along the exposed vertical surface especially when the stone surface may be of considerable height extending up from a quarry floor. It is also extremely difficult and expensive to position wedges and work them in a vertical stone surface of the character described. The removal of wedge parts from a vertical section which has been split and opened unfortunately results in some of the wedge elements dropping downwardly with loss of wedge parts taking place and unnecessarily expensive labor to retrieve and reassemble the parts.

It is, therefore, a chief object of the present invention to provide improved methods and means for working materials, and especially to provide an improved method and multiple-tool apparatus for applying wedging forces in a mass of material.

Another object is to apply multiple wedging forces by means of a gang of wedge devices all of which are contained in a common wedge-retaining structure capable of being utilized as a mobile unit.

Another object of the invention is to devise a method and apparatus for splitting mineral bodies by means of multiple wedging forces which may be exerted simultaneously to produce a cumulative wedging effect in a mass of materials.

Another object of the invention is to devise a multiple-tool apparatus in which a plurality of wedges are received and supported for selective operation so that a cumulative wedging action may be gradually increased in a constantly controlled manner to regulate the angle and extent of splitting at any given point.

A further object of the invention is to devise a multiple tool apparatus in which each one of a gang of wedges supported in a common retaining frame may be operated in a sequential manner, or if desired, all of the wedge devices may be operated simultaneously.

Another object is to devise a method of applying multiple wedging forces in a controlled manner so that the forces reach a maximum intensity almost instantly or, if desired, the forces may be applied with gradually increasing intensity over a predetermined time interval.

Having in mind the foregoing objectives, we have conceived of a method of multiple-tool operation which is particularly suitable for exerting multiple wedging forces along a plane of splitting which may be extended from a surface of a mass of material inwardly in any desired direction. Our improved method of multiple tool-operation, in one preferred form, is based on the principle of concentrating a considerable number of simultaneously applied wedging forces in a controlled manner along a desired plane of splitting in a mass of stone or other body.

We have found that these simultaneously exerted forces may develop unusual stresses in the stone and as the cumulative effect builds up, a point is reached where all of the wedging forces act together through a substantially common plane of cleavage or splitting to separate the stone and to produce plane faces of splitting of extended length.

An important feature of our method of splitting is the combined wedging effect of a gang of reciprocating wedge units arranged in predetermined spaced relationship and operated simultaneously. Each unit includes wedge elements, a driver mechanism, and a retaining apparatus whereby the wedge elements may be yieldably held, and when desired, forced by fluid or other pressure into a wedging position and yet all of the parts are at all times retained in adjustably interlocked relationship. Thus the wedging operation can be accomplished and the wedge parts can be withdrawn after splitting occurs without damage or separation of wedge components from one another in such a fashion that they are in position for re-use.

The nature triangular the invention and its other objects and novel features will be more fully understood and appreciated from the following detailed description of the apparatus as shown in the accompanying drawings in which:

FIG. 15 is a fragmentary elevational view of tracer bay and tracer tool means of the invention in a normally retracted position.

FIG. 16 is a fragmentary elevational view similar to FIG. 15, but showing the tracer tool advanced into a working position.

FIG. 17 is a fragmentary end elevational view of the tracer mechanism of FIG. 15.

FIG. 18 is a fragmentary perspective view showing further details of a chain drive for the tracer means.

FIGS. 19 – 21 are detail views showing further structural portions of the tracer drive means.

FIG. 24 is an elevational view of portions of a drill bay with a drill mounted therein.

FIG. 25 is another view of the drill means.

FIGS. 26 – 29 are views of the wedge bay and wedge devices mounted therein.

FIG. 31 is a schematic view illustrating a flow diagram of control means for operating hydraulically actuated parts of the machine.

FIG. 32 is a detail exploded view of arbor and locking plate components.

FIGS. 33, 34 and 35 are additional detail views of the revolving frame.

FIGS. 36 – 39 are diagrammatic views illustrating the revolving frame of the machine moved through successive working positions.

FIG. 43 is a view showing the machine in a vertically disposed working position.

FIG. 44 is an elevational view illustrating the reciprocating wedge apparatus of the invention.

FIG. 45 is a cross-sectional view showing a rock body with a hole drilled therein and the reciprocating wedge apparatus of FIG. 44 supported within the hole.

FIG. 48 is an exploded view of a novel wedge feather and wedge plug assembly.

FIG. 49 is a cross-section taken on the line 49 — 49 of FIG. 48.

FIG. 50 is a cross-section taken on the line 50 — 50 of FIG. 49.

FIG. 51 is a detail perspective view of a wedge component.

FIG. 52 is a detail elevational view of the component shown in FIG. 51.

Referring more in detail to the structure shown in the accompanying drawings, it will be observed that we have illustrated one preferred embodiment of the invention as utilized in a granite quarry, and the following detailed description of the invention will be set forth in particular reference to this specific usage. It will be understood, however, that this is not done in any limiting sense and the invention may be utilized in various other fields of use as hereinafter noted.

Attention is also directed to the fact that the present invention in one desirable form is based on an improved method of exerting wedging forces in a drilled stone mass, which method is not dependent upon periodic hammering as is commonly the case with conventional wedging operations. Pairs of semi-cylindrical wedge feathers, of the type disclosed in our co-pending application Ser. No. 793,348, filed Jan. 23, 1969, are arranged to be moved into contact with opposite sides of drilled holes so as to engage the holes throughout their lengths. It has been discovered, as described in more detail in Ser. No. 793,348, that by exerting continuously sustained and very rapidly augmented fluid power actuated driving forces on a wedge plug acting along substantially the entire inner surfaces of the cylindrical wedge feathers, the wedge feathers are displaced in two opposite directions and it becomes possible to carry out a controlled and substantially intensified splitting action of significant value.

In the present application, the potential value of this method of exerting wedging forces has been broadened and developed to a very significant degree by providing a mobile quarrying machine and by utilizing a gang of the wedging devices arranged in the mobile machine one beside another in a manner such that the wedging devices may be located close to a surface and the cumulative action of all the wedging devices may be concentrated along a single predetermined line of splitting to produce highly uniform faces of precision splitting in the surface. Application of this improved multiple wedging technique may take several forms and is very effectively realized either when used independently or when employed in combination with certain other steps including flame channelling and wire sawing as noted below.

Figure 2:
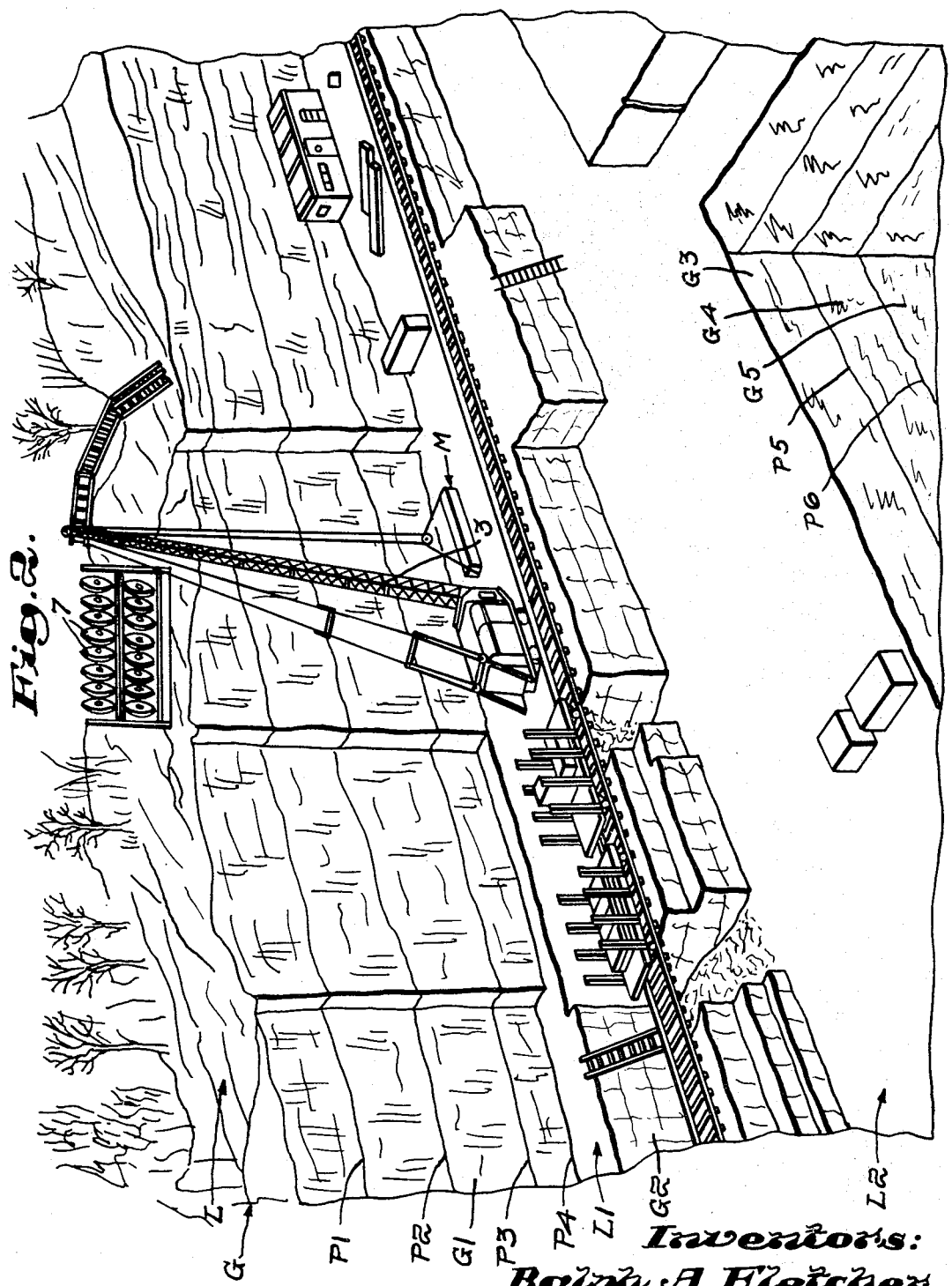
FIG. 2 is a diagrammatic view illustrating further details of a typical granite quarry with which the method and apparatus of the invention may be employed.

In FIG. 2, for example, there is illustrated diagrammatically a typical granite quarry which comprises masses of exposed granite sections generally indicated by the arrow G and occurring in a natural state and extending form a surface level L downwardly to varying depths. A well-known characteristic of the granite mass as G is the occurrence of lines of parting which extend more or less horizontally through the mass and are indicated by parting lines P1, P2, P3, P4 and P5, for example. Reference characters L1, L2 denote beds or quarry bottoms resulting from removal of granite sections along parting lines, and when granite sections are thus removed, there is left exposed vertical surfaces of granite as G1, G2, G3 and G4 and G5, etc.

Figure 3:
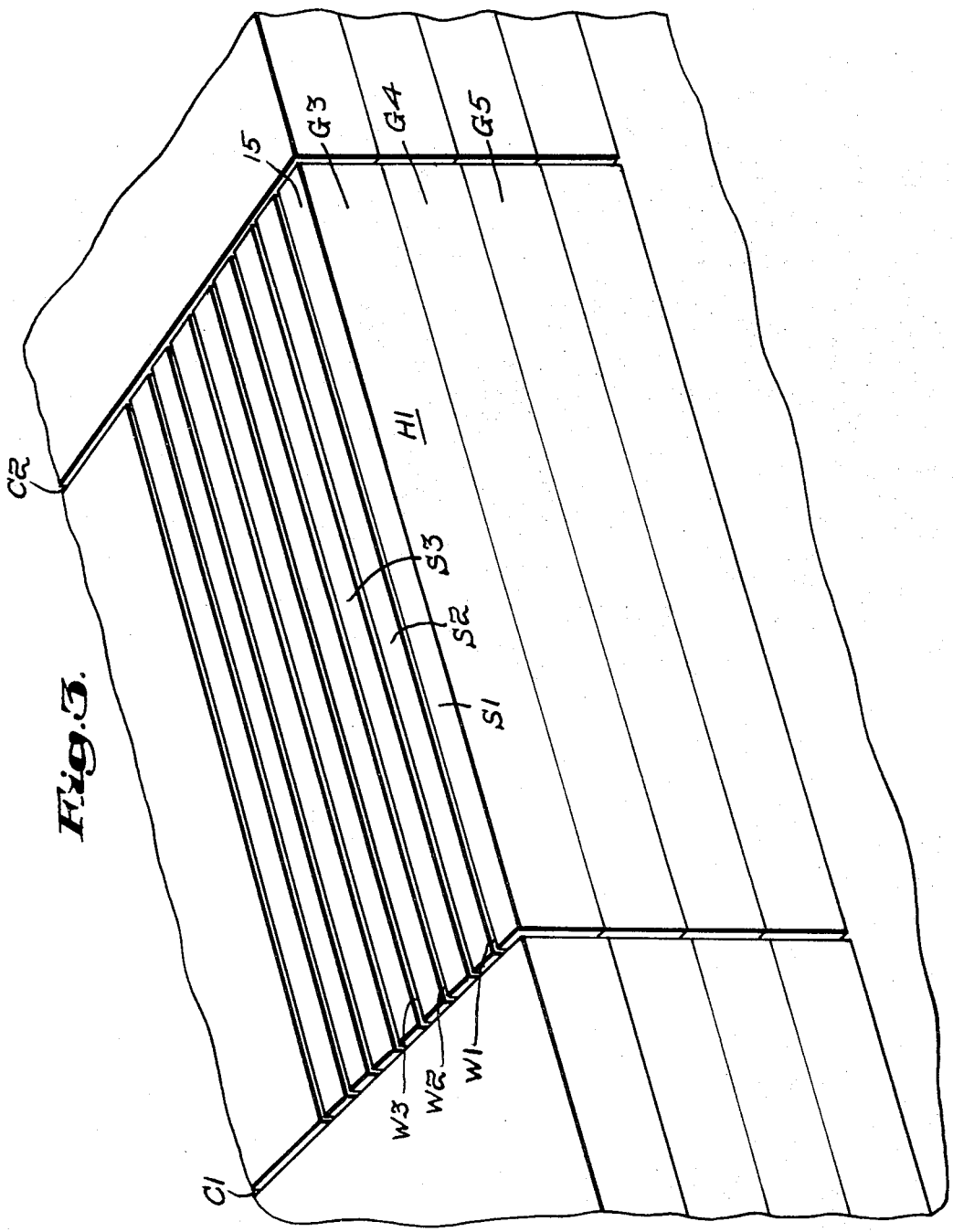
FIG. 3 is a fragmentary perspective view of a mineral body such as granite illustrating diagrammatically the steps of flame channelling and wire sawing with which steps the splitting method of the invention may be combined to provide stone sections of predetermined dimensional characteristics.

In one desirable form of the invention, granite masses as G3, G4 and G5, etc. of FIG. 2, also illustrated diagrammatically in a larger scale in FIG. 3, are first subjected to the step of flame-jet channelling utilizing a method of channeling, for example, as described in U.S. Pat. No. 3,019,004, owned by the assignee of the present application. The steps of flame-jet channelling forms channels such as the vertically extending channels C1 and C2 shown in FIGS. 3, 4 and 5. These channels may be of considerable depth ranging from a few feet up to as much as 80 to 100 feet and more, and the channels may be spaced apart a substantial distance as shown.

In a second step in our improved method, the body of granite lying between these vertical channels C1 and C2 is subjected to a wire-sawing operation which may be of the type disclosed in U.S. Pat. No. 2,860,862, also owned by the assignee of the present application. Wire saws suitable for this operation are i dicated at 7 in FIG. 2. The wire-sawing operation provides a series of wire-saw cuts as W1, W2, W3, etc. (FIG. 3) which may also extend vertically downwardly to a depth nearly approximating the depth of the flame cut channels C1 and C2. There are thus defined stands of granite sections as S1, S2, S3, etc. which have sawn vertical surfaces and flat top surfaces resulting from earlier removal of stone sections along a parting line of the character described above.

Figure 1:
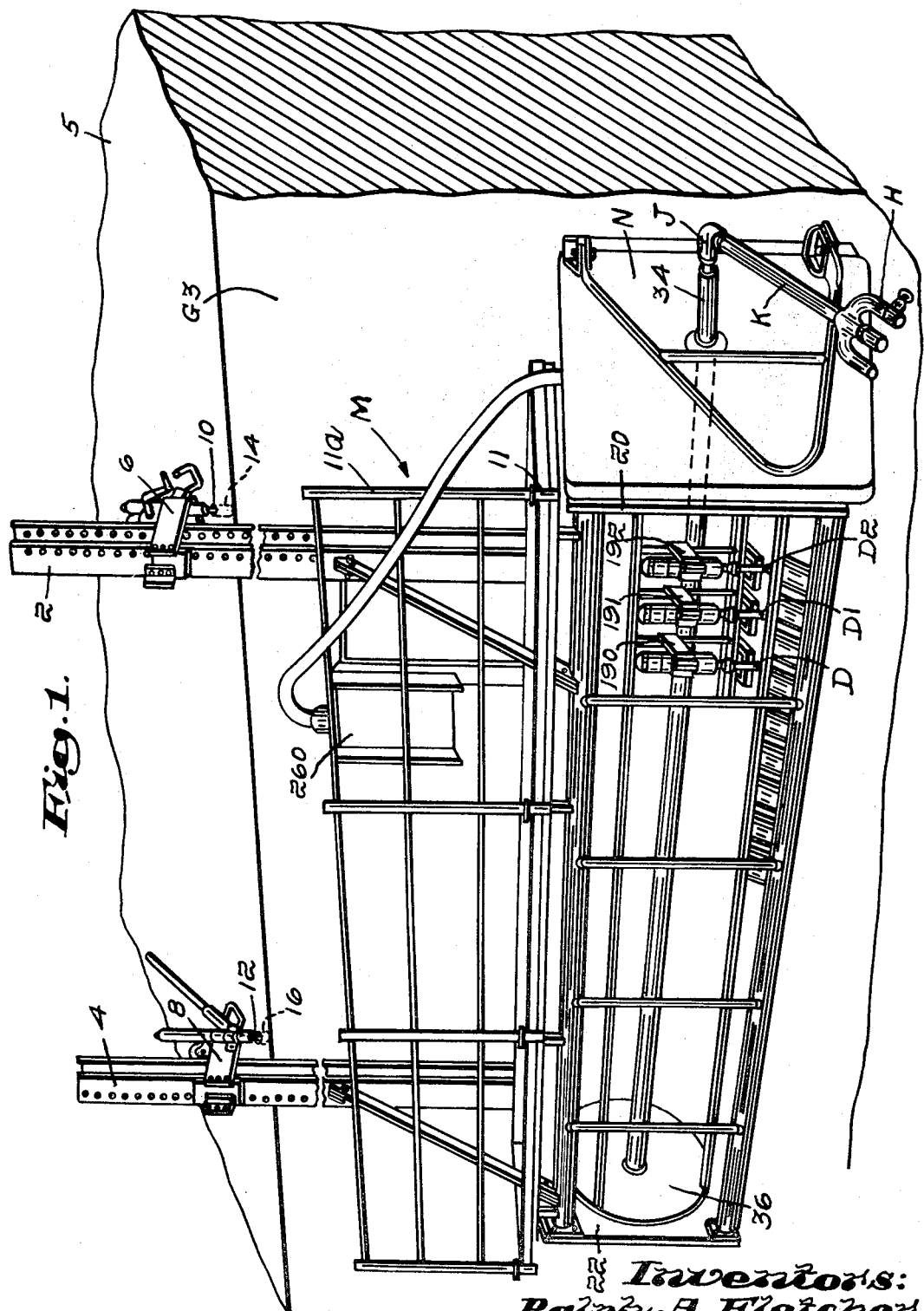
FIG. 1 is a perspective view illustrating diagrammatically the apparatus of the invention supported in one desirable position for working a vertically exposed surface of a mineral body which is fragmentarily indicated.

In accordance with a further step of the invention, we then transport the multiple tool apparatus of the invention to a working position adjacent to one of the stands of granite sections and thereafter apply multiple wedging forces which are exerted from outermost vertical surface H1 inwardly. This is accomplished by supporting the multiple tool apparatus of the invention against the vertical surface H1 in suspended relationship in some convenient manner. As illustrative of one suitable way of doing this, we may provide the multiple tool apparatus with vertical hanger members 2 and 4 as shown in FIG. 1 and these vertical hanger members are solidly secured to the apparatus, as suggested in FIG. 1, and are further provided with vertically adjustable bracket assemblies 6 and 8 which carry holding pins as 10 and 12 for engaging in holes as 14 and 16 formed in the upper side 15 of the granite section G3.

The handling and positioning of the multiple tool apparatus in relation to the granite mass G3 may be conveniently carried out by means of the crane apparatus 3 shown in FIG. 2 and commonly used in the granite quarry for various other purposes such as manipulating flame-jet equipment and loading and conveying sections of granite which have been separated from the quarry bed.

In FIGS. 1, 2, 4, 9 and 10, the multiple tool apparatus is shown located in a horizontally disposed working position relative to the vertical granite section G3, and is generally indicated by the reference character M. The apparatus is further shown in a vertically disposed working position in FIGS. 5 and 47, and it will be understood that the apparatus may also be supported for working a surface of a granite section which extends in a horizontal plane.

Figure 4:
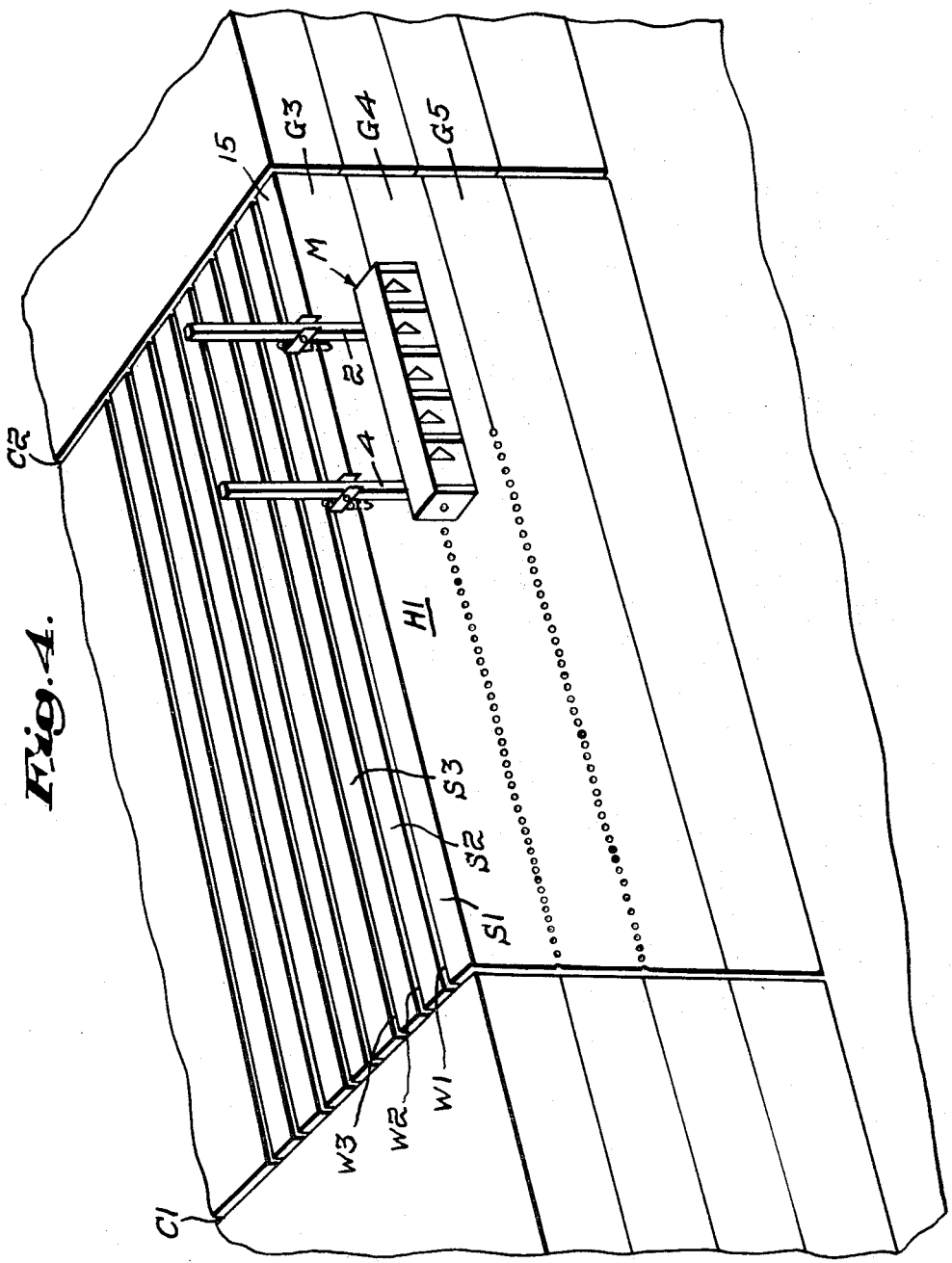
FIG. 4 is a fragmentary perspective view of the mineral body shown in FIG. 3 and further indicating the apparatus of the invention in position to carry out one type of splitting operation.
Figure 5:
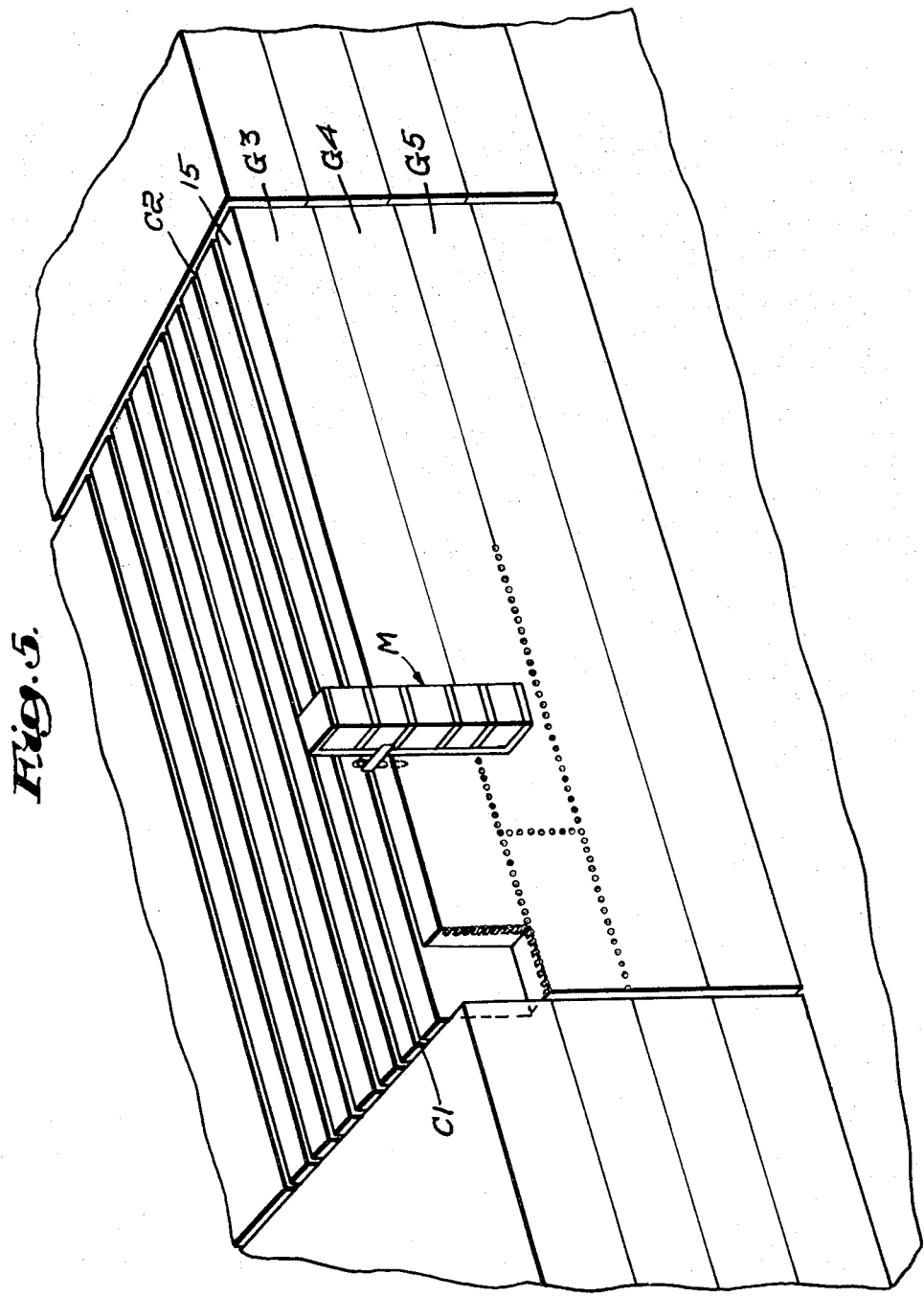
FIG. 5 is still another view showing the mineral body of FIGS. 3 and 4 and further indicating the apparatus of FIG. 4 in another operative position for carrying out a different kind of splitting operation.
Figure 6:
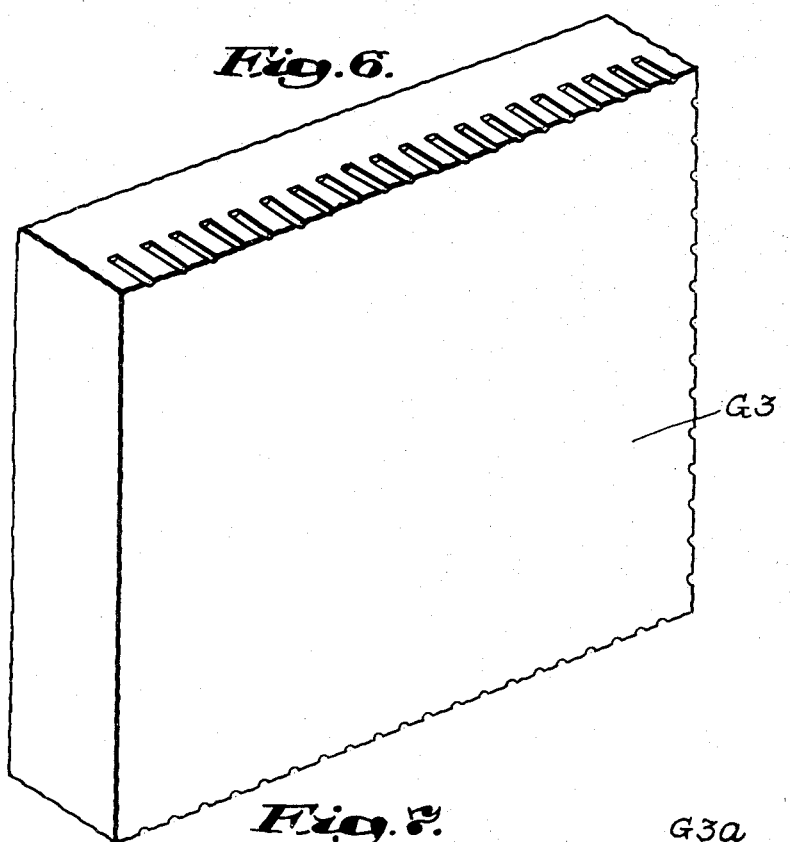
FIG. 6 is a perspective view of a stone section removed from the mineral body of FIG. 5.
Figure 7:
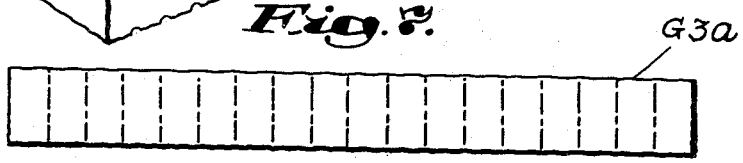
FIG. 7 shows the stone section of FIG. 6 with lines of subdivision being indicated.
Figure 8:
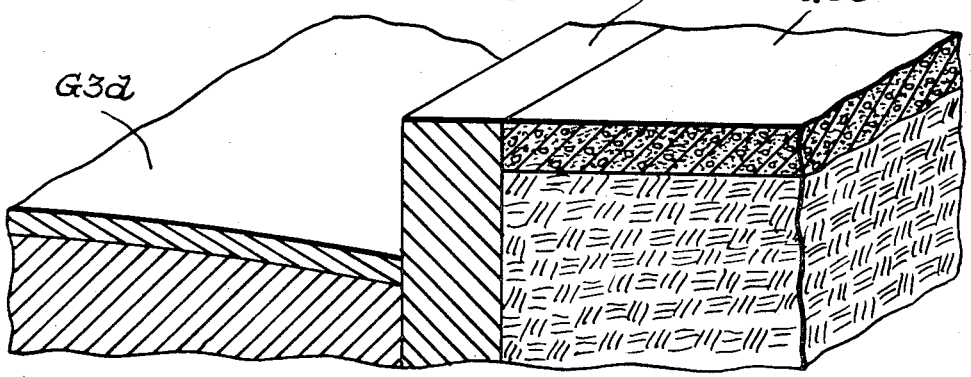
FIG. 8 is a detail perspective view, partly in cross section, showing one of the pieces of dimension stone obtained from the product illustrated in FIG. 7 and further indicated in an actual installation constituting a highway curb.
Figure 9:
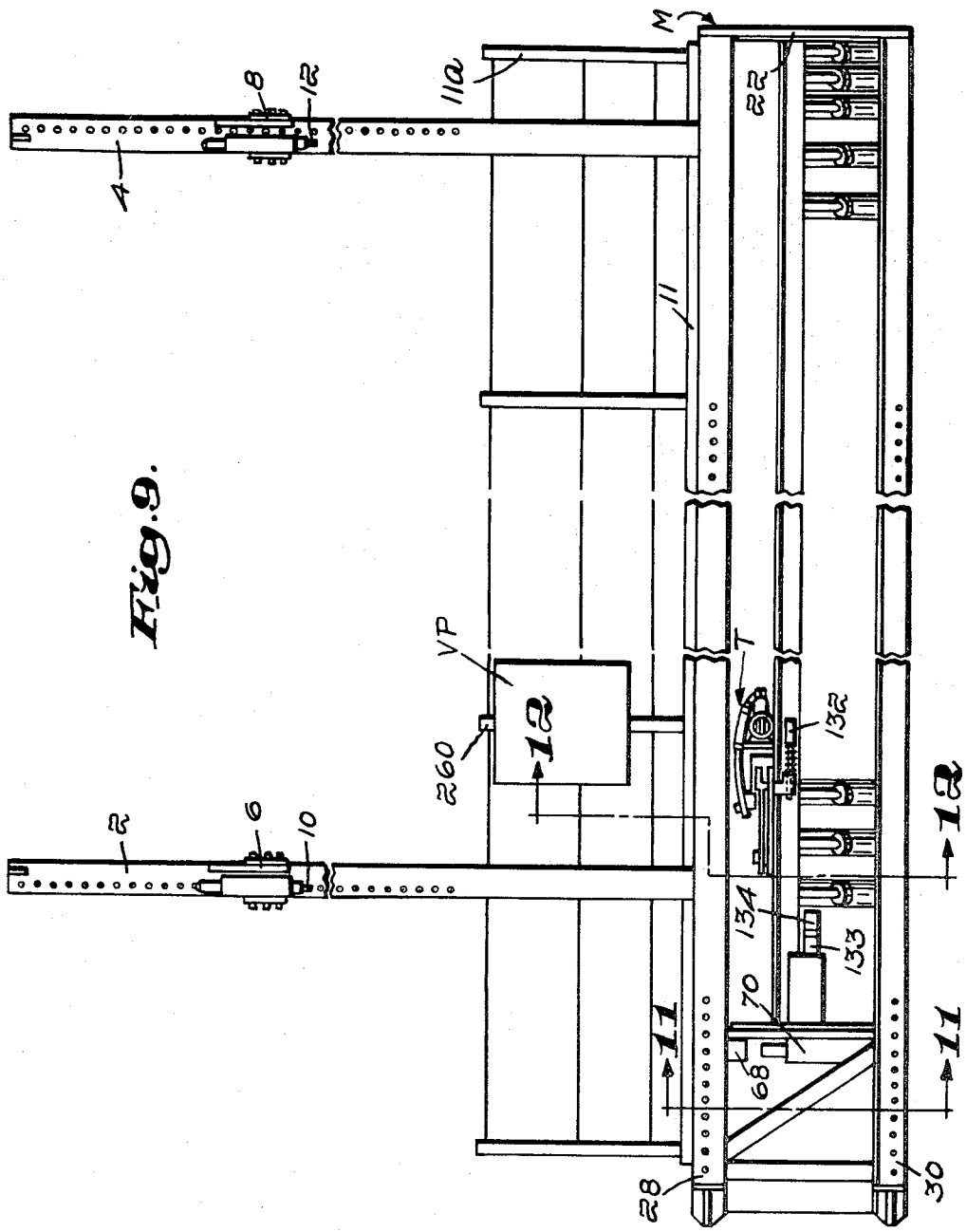
FIG. 9 is an elevational view illustrating the apparatus of the invention.
Figure 10:
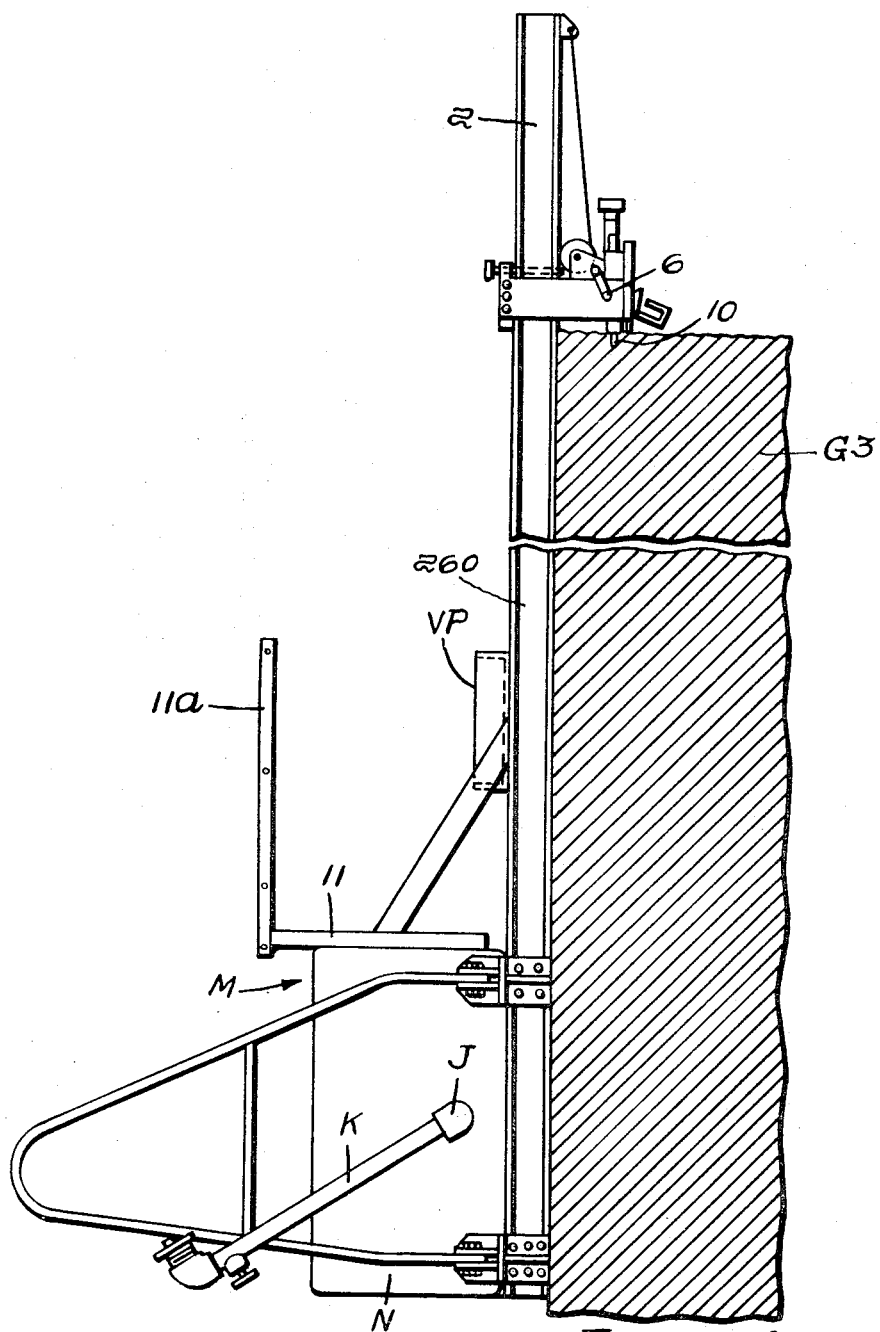
FIG. 10 is an end elevational view of the apparatus indicated in FIG. 9 and further illustrating method for holding the apparatus in suspended relationship with respect to a vertical surface of a mineral body.

In the procedure illustrated in which splitting takes place from the vertical surface G3 inwardly, the apparatus M is first placed in a horizontally disposed position. Thereafter, when desired, the apparatus M may be located in a vertically disposed position as suggested in FIGS. 4 and 5. In this way, small sections of granite may be split along two planes of splitting and removed, as indicated diagrammatically in FIG. 5. One such small section of granite as removed from the body of granite G3 of FIG. 5 is further illustrated in FIG. 6 and denoted by reference character G3a. FIG. 7 illustrates the section ready to be split into smaller sections of a size suitable for granite curb and FIG. 8 illustrates a curb section G3b installed between a sidewalk G3C and an adjoining highway G3d.

Splitting the stands of granite sections to form dimension stone, as carried out by the invention method being described, may, we find, be very effectively accomplished by combining a wedging step with certain other steps. Thus we may employ a first step of tracing or scoring a line of desired splitting along a predetermined path on the exposed vertical surface H1. A second step involves simultaneously drilling a plurality of space apart holes along the line of scoring. A further step consists in advancing a gang of composite wedge devices into the drilled holes. Thereafter, the components of each composite wedge device are displaced in two opposite directions to exert wedging forces and form a cleavage in the granite section being worked. In a final step, the wedge components are allowed to move back together and to be retracted from the cleavage.

The multiple tool apparatus M used in carrying out the several steps noted may be conveniently referred to as a quarrying machine, although it should be understood that the apparatus M is not limited to use in a quarry. In general, the components of the quarrying machine M include a mobile tool supporting structure and a revolving frame in which is rotatably supported a gang of wedge devices, a gang of drills, and a tracer tool movable along an extended path of travel in the tool supporting structure. Fluidic control of movements of these parts is carried out by means of pneumatically and hydraulically operated control devices and these control devices are operated from an operating panel which is mounted at the upper side of the quarrying machine at some conveniently accessible point.

The tool supporting structure is formed with a work engaging side along which extends an elongated opening to provide for movement of a gang of tools in and out of engagement with a surface of a mineral body such as the vertical surface H1. The tools noted are mounted around a triangularly shaped revolving frame which is rotatably received in the tool supporting structure and which is provided with power driving means for indexing each set of tools successively into register with the opening in the work engaging side.

An important component of the revolving frame is an elongated tubular arbor which serves in the sual capacity of functioning as a rotating shaft and also constituting a conduit for carrying a pressurized fluid such as compressed air which is utilized to provide for fluidic control of certain machine movements. Air conduits connecting with the arbor provide for flow of air to desired points under the control of operating handles on the control panel. The conduits are arranged along the revolving frame at various points to power the various tools. In addition to the compressed air conduits noted, we also employ hydraulic fluid conduits arranged in the machine to actuate hydraulically operated devices for carrying out certain other machine movements.

FIG. 1 shows the machine in a typical operating position and as indicated therein, a platform 11 may be provided along an upper side for supporting an operator in a position to manipulate control buttons on the valve control panel VP, and the platform may include a guard railing 11a. In FIGS. 32 and 33, there are illustrated, components of a cage portion of the machine M as this structure appears when first assembled without tools. As shown in FIG. 33, the cage member is made up of a pair of end walls 20 and 22 which are rigidly secured in spaced relation by tubular members 24 and 26 and I-beams 28 and 30. End wall 20 is further supported by angle braces 31 and 32 as shown.

In one typical quarry machine successfully employed in a granite quarry of the class earlier described and illustrated in FIGS. 2, 3, 4 and 5, the length of the cage structure may be approximately 21 feet. The height of the machine may be approximately 3 feet and the width may be approximately 3 feet also. It will be understood that the machine may be made in various other sizes. In this machine as many as 24 individual drills and wedges may be utilized.

Located centrally through the end walls 20 and 22 in suitable bearings is an elongated tubular arbor member 34 which is mounted for rotation through a limited arc of travel as hereinafter described and which is closed at one end for sealably containing a pressurized fluid such as compressed air. At opposite ends of the tubular arbor 34 are fixed circular locking plates 35 and 36 also shown in detail in FIGS. 34 and 35. Solidly secured to the tubular arbor at spaced intervals therealong are triangularly shaped frame plates as 38, 39, 40, 41, etc. At one end, arbor 34 extends through end wall 20 and is connected through a swivel joint member J (FIG. 1) to a compressed air line K in turn connected to a source of compressed air, such as an air compressor of conventional type not shown in the drawings. We may also desire to cover the extended portion of the arbor 34 with a protective housing N.

Welded or otherwise fastened to outer corner portions of these frame plates is a pair of tracer supporting angle iron members 44 and 46, a second pair of drill supporting angle iron members 48 and 50 and a third set of wedge supporting angle iron members 52 and 54. In FIG. 35, one arrangement of the angle iron members 52 and 54 has been shown in more detail.

Figure 12:
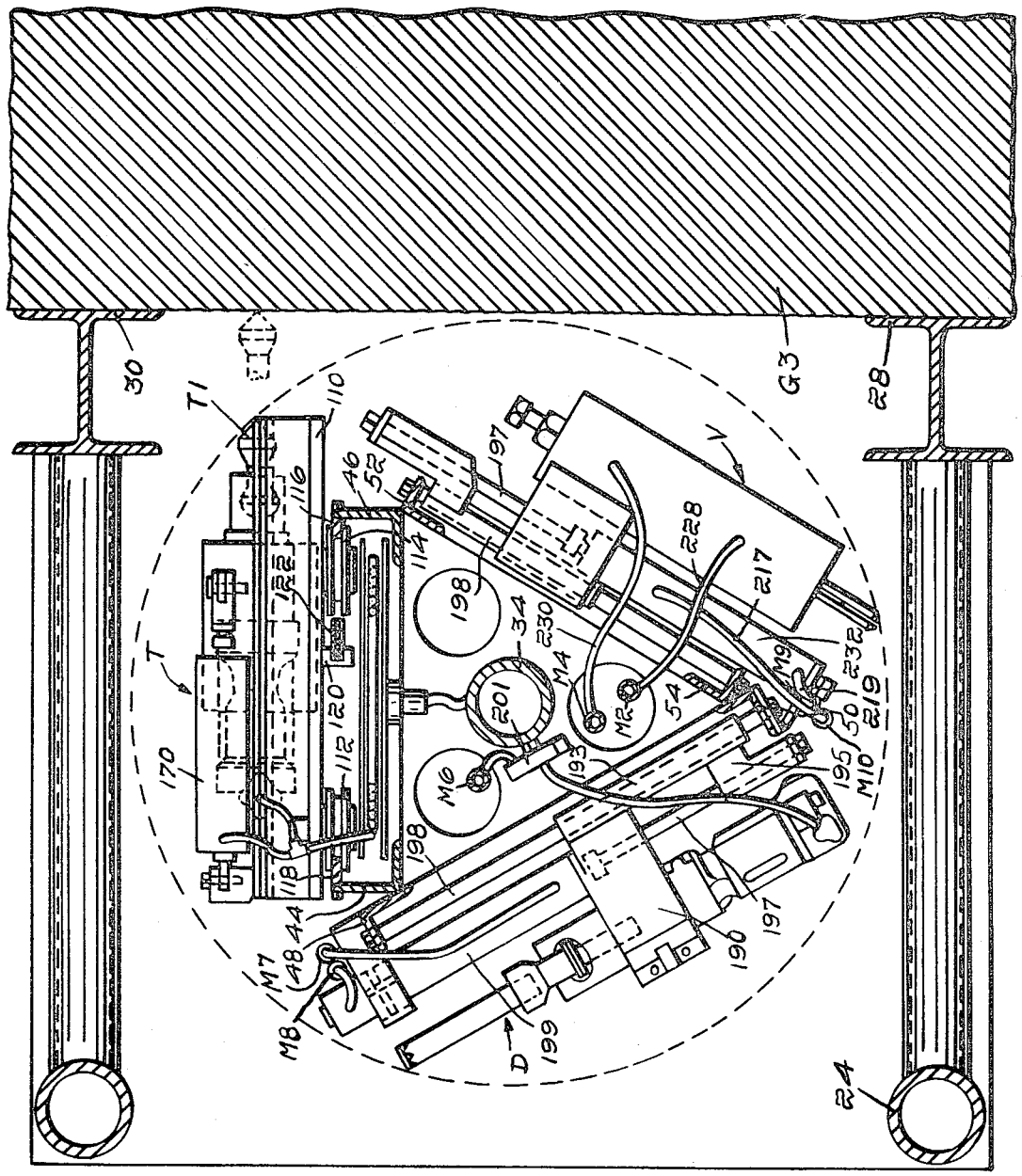
FIG. 12 is a cross-section taken approximately on the line 12 — 12 of FIG. 9 with the tracing tool component of the invention in a working position to engage against a vertical work surface.
Figure 13:
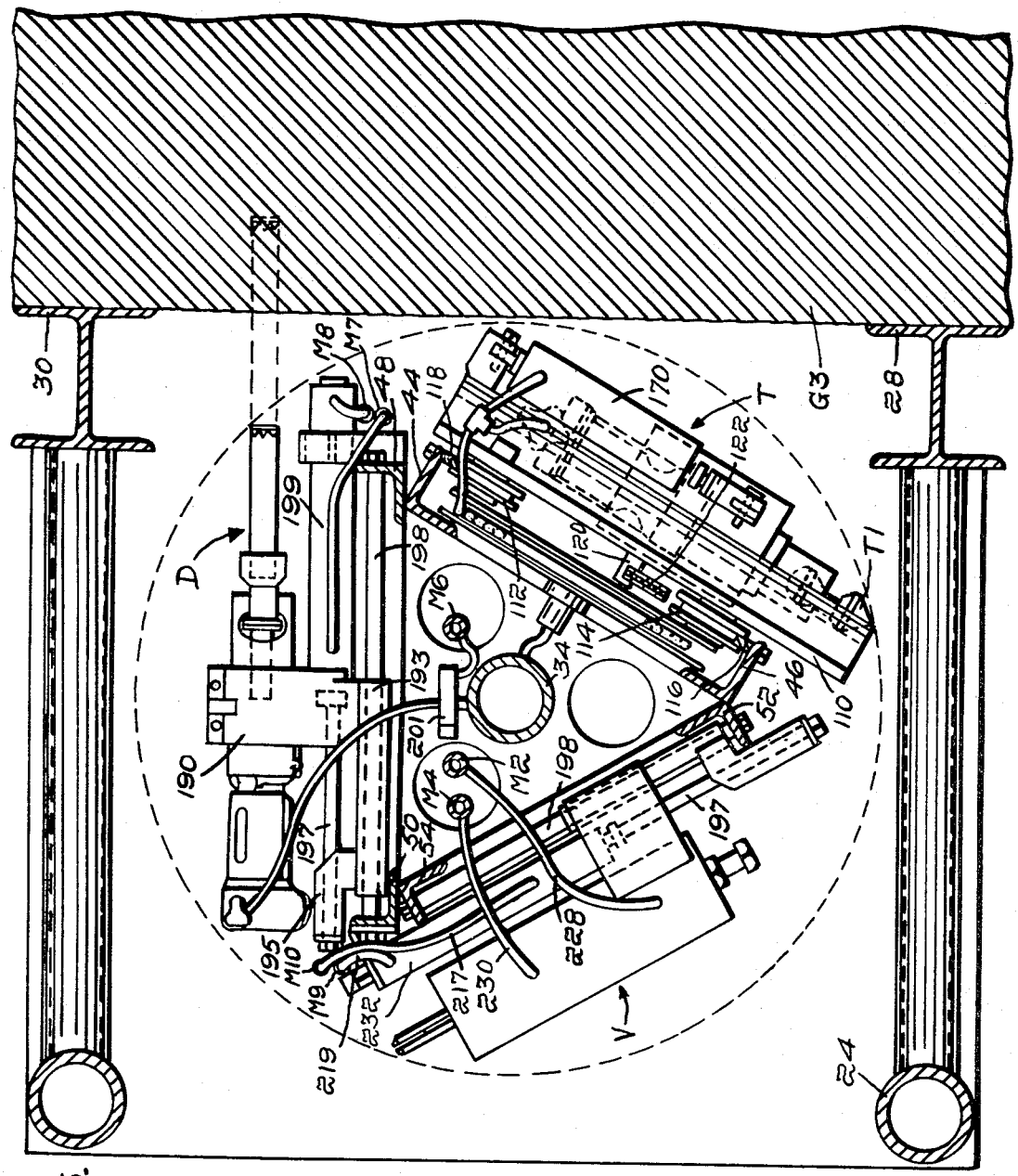
FIG. 13 is a cross section similar to FIG. 12 but taken with drill means rotated into a working position.
Figure 14:
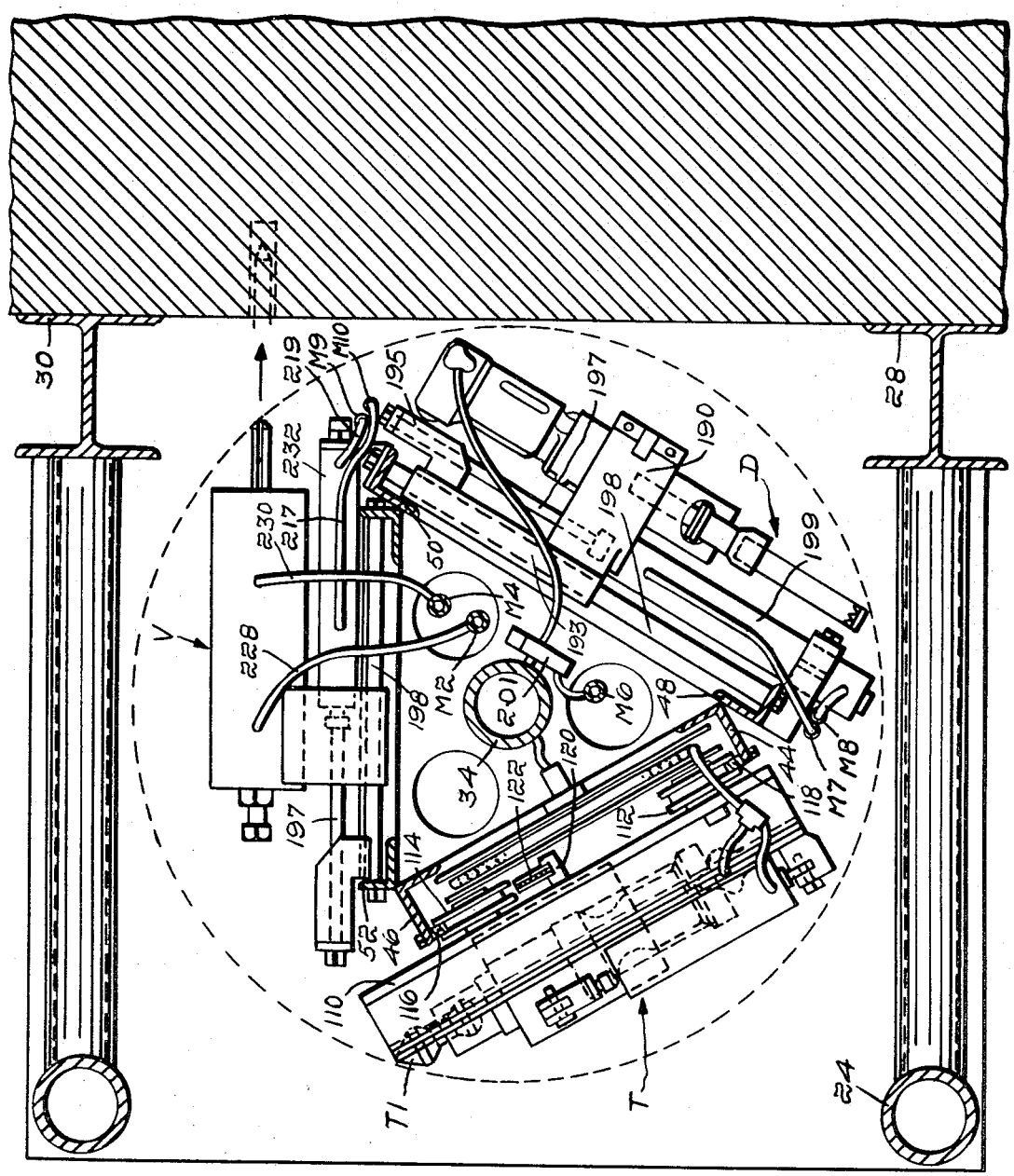
FIG. 14 is a cross-section similar to FIGS. 12 and 13 but showing wedge device components of the invention rotated into a working position.

The three pairs of angle iron members are more clearly shown in FIGS. 12, 13 and 14. Each of the pairs of angle iron members are extended beyond the frame plates as shown in FIG. 35, for example, and are solidly secured by welding or other means, to the circular plates 35 and 36. It will be observed that each pair of angle iron members is positioned along the frame plates in such a manner that two of the legs of each pair lie in a common plane while the other two respective legs of the pair extend outwardly in parallel spaced apart relation to one another so that in each case, the parallel spaced apart sides constitute means for supporting tool structure therebetween as hereinafter described.

It is also pointed out that by reason of the triangular shape of the several frame plates 38, 39, 40 and 41, etc., the angle iron member of any one pair tends to occur at an acute angle with one of the angle iron members of an adjacent pair. Thus there are created in effect three tool supporting areas or bays, as may be readily seen from an inspection of FIGS. 12, 13 and 14.

In the bay constituted by the angle iron members 44 and 46 is mounted a traveling tracing mechanism T as shown in FIG. 15, and the tracer carries a tracer tool T1 movable through the frame structure as suggested in dotted lines at the lower side of FIG. 15. The tracer mechanism is further illustrated in FIGS. 12, 13 and 14 and in FIGS. 15 to 22, inclusive.

In the bay constituted by the angle irons 48 and 50, are provided a series of spaced drill assemblies, and one of the drill assemblies D is illustrated in detail in FIG. 24. The drill assembly D is also illustrated in FIGS. 12, 13 and 14.

Similarly in the bay constituted by the angle irons 52 and 54 are supported reciprocating wedge devices and one reciprocating wedge device V is illustrated in detail in FIGS. 26 to 29 inclusive, and is also indicated in FIGS. 12, 13 and 14. Thus it will be seen that by means of the arrangement described, the tracer mechanism, the drill assemblies and the gang of wedge devices are all supported for rotation with the central tubular arbor 34 in the tool supporting structure.

In accordance with the invention, we control the rotative movement of arbor 34 so that each of the bays and the tool means supported therein may be successively moved into register with the elongated opening in the work engaging side of the tool supporting structure in a desired sequence. This is accomplished, for example, by having the tracer bay normally positioned in register with the work engaging side at the start of a splitting operation.

Figure 40:
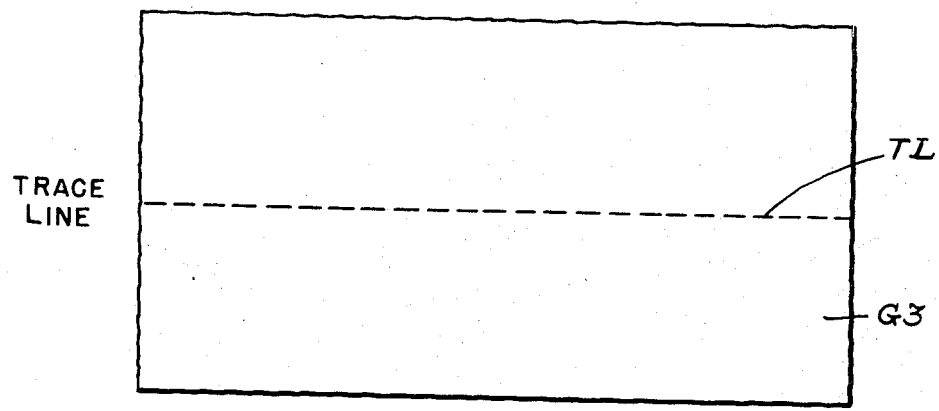
FIGS. 40, 41 and 42 are diagrammatic views illustrating steps in working a mineral body as carried out with the apparatus of the invention.
Figure 41:
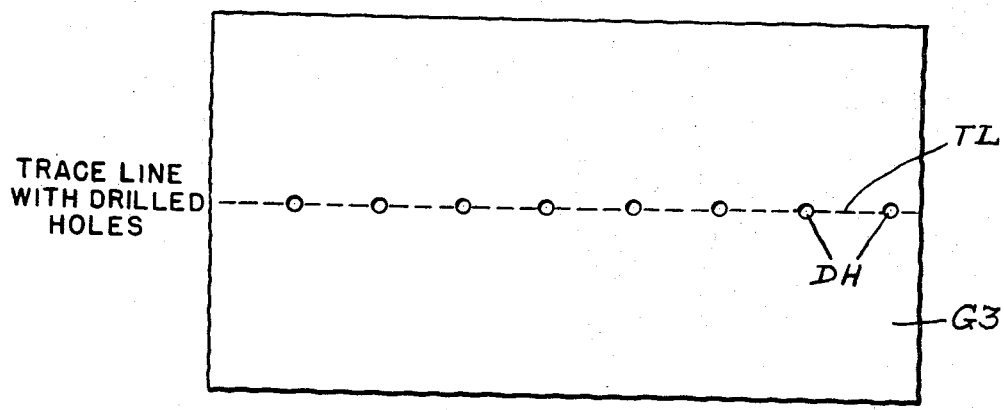
Figure 42:
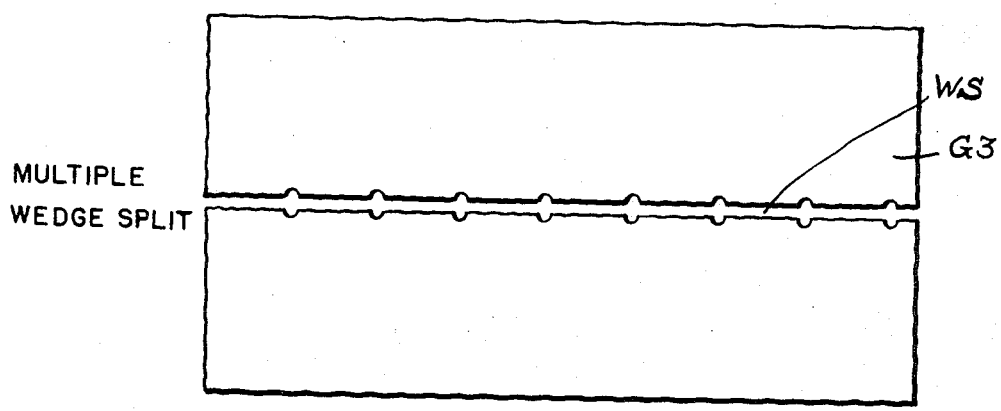

In the starting position noted, with the tracer tool in operation, a scored line TL is first traced on a work surface as illustrated in FIG. 40. Then, the arbor is rotated through an arc of 120° to register the drill assembly with the opening in the work engaging side. The drills in this position form a series of spaced holes, DH, along the scored line as shown in FIG. 41. Thereafter a further rotation of the arbor through another 120° positions the wedge devices in register with the holes drilled by the drill members. The wedges are engaged in the holes and immediately expanded to form a line of splitting WS as suggested in FIG. 42. In each position of register described, it will be understood that a suitable interval is provided for tool working to carry out desired operations of tracing, drilling and wedging. At the end of the wedging operation, the wedges are retracted and the arbor 34 and its supporting parts are rotated back through an arc of 240° so that the tracing tool is returned to its starting position.

Figure 11:
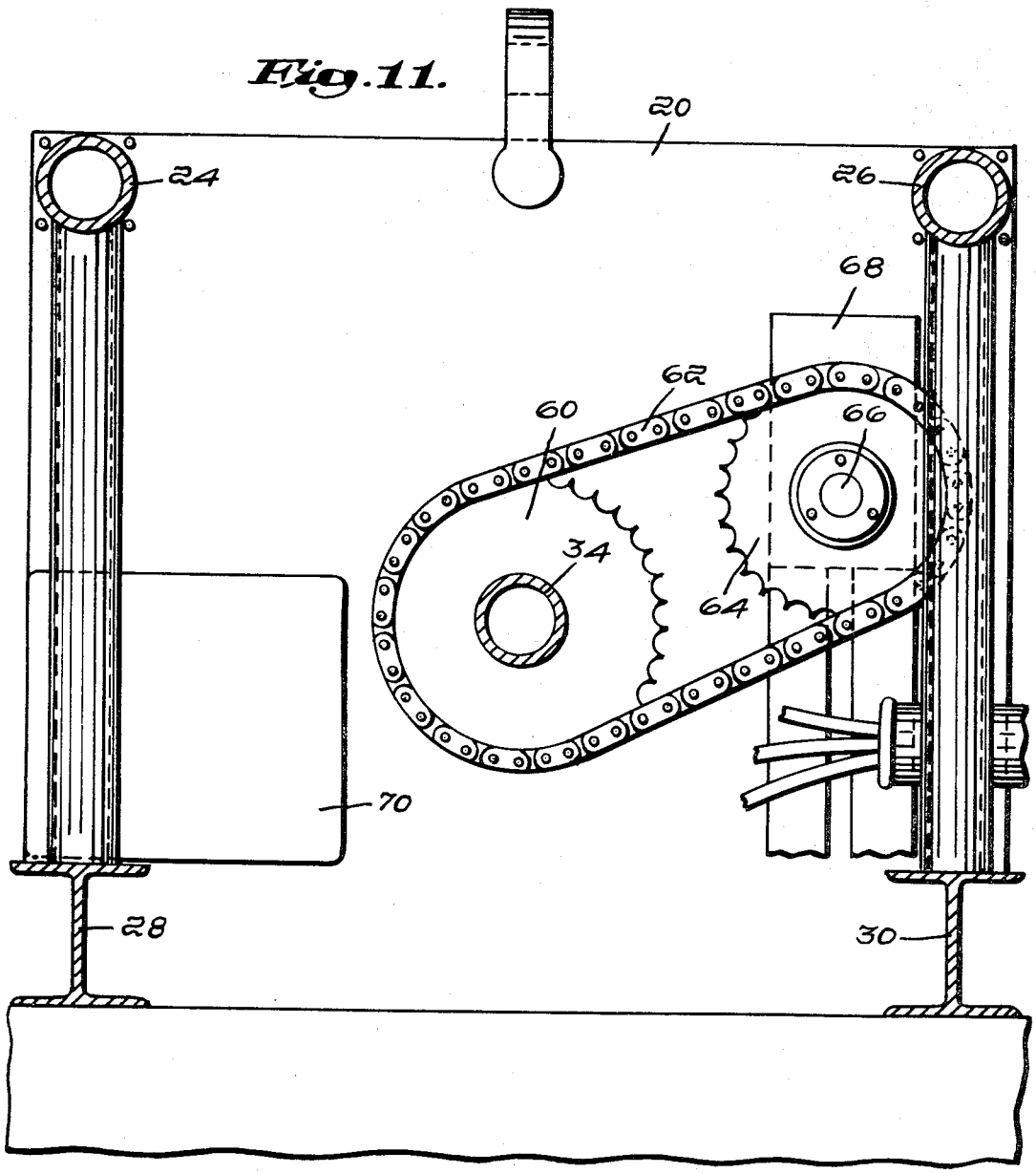
FIG. 11 is a cross-section taken on the line 11 — 11 of FIG. 9 with the apparatus turned into a position to engage against a horizontal surface of a work area.

As illustrative of one suitable drive means for carrying out the rotative movements described, we may employ a hydraulically operated drive which is illustrated diagrammatically in FIG. 31. Portions of this drive mechanism are also illustrated in FIGS. 11 and 18. Included in this drive mechanism is an oil supply unit 70 (FIG. 11) which has an oil tank for holding a quantity of oil or other fluid together with pump means for pumping a flow of oil out of the tank. Oil pumped from tank 70 is employed to actuate a hydraulic rotor mechanism 68 fixed to the end wall 20 at an outer side thereof as shown in FIG. 11. Oil is also conducted from the pump through oil manifolds M2 and M4 which are located along one side of the arbor 34 and which extend through holes in the frame plates 39, 40, 42, etc. as illustrated in FIGS. 12, 13 and 14 and in FIGS. 26 and 27. Flow of oil through these manifolds is controlled by valves in the control panel VP as hereinafter noted.

Figure 30:
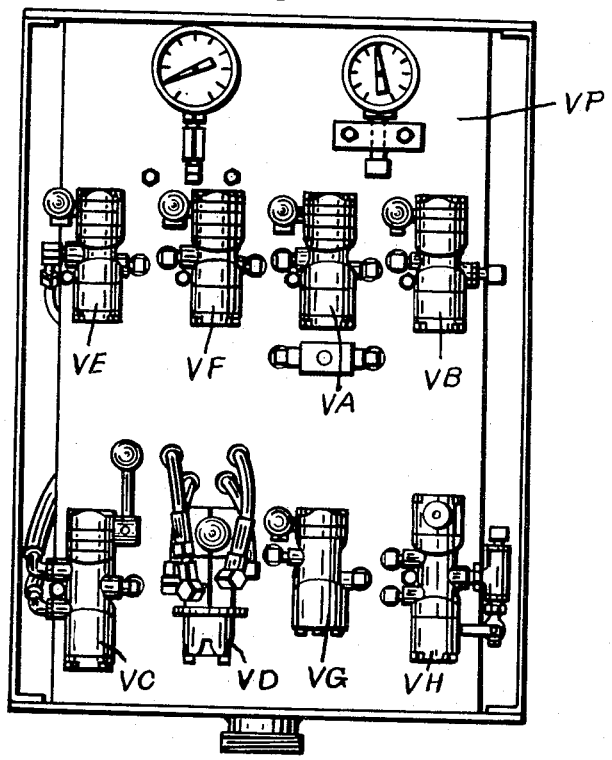
FIG. 30 is an elevational view of a panel member for supporting a plurality of control members employed in operating the mechanism of the invention.

The hydraulic rotor mechanism 68 is provided with a shaft 66 on which is fixed a sprocket wheel 64 carrying a chain 62. Chain 62 also engages around a second sprocket wheel 60 which is fixed on an outer end of arbor 34. FIG. 31 illustrates diagrammatically portions of this hydraulic rotor mechanism together with flow lines and valves for conducting hydraulic fluid from the tank 70 to member 68 and back. The control valves for regulating flow of fluids through this system are located on the control panel VP as illustrated in FIG. 30. One of these valves consists in a valve VB which starts an air driven motor in the oil tank for actuating pump member 70 which then powers the hydraulic rotor mechanism. A hydraulic valve VD when operated in one position directs a flow of hydraulic fluid through the hydraulic rotor mechanism 68 to turn the arbor 34 through a desired arc of rotation in one direction. When valve VD is placed in another position, the direction of rotation of arbor 34 is reversed.

The rotation of the arbor 34 induced by the hydraulic rotor mechanism is limited to predetermined arcs of travel as noted above, and as one suitable means of accomplishing this, we provide an arbor locking mechanism. This arbor locking mechanism is pneumatically controlled by air from arbor 34. Flow of air is controlled by an air valve VC on panel VP shown in FIG. 30.

The arbor locking mechanism is shown in further detail in FIG. 18 and includes a vertical arm 80 pivoted at 82 carrying a link member 84 for operating a lock member 85 in a guide anchor block which is adapted to engage in the end plate 22 by means of notches as 88, 90 and 92. The arm 80 and its lock 86 is prevented form disengagement, when air is not supplied, by a spring 94 anchored to the end of the machine frame. At its lower end, the arm 80 is pivotally attached at 96 to a piston member 98 received in an air cylinder 100. The air cylinder 100 is operated through two air lines 102 and 104 which are in turn connected to the VC valve on panel VP for two-way operation. It will be understood that a similar locking mechanism is provided at the opposite end of the machine on circular locking plate 35.

When compressed air form arbor 34 is led into cylinder 100 (FIG. 18), the piston 98 moves the arm 80 about its pivot 82, and this disengages locking element 86 from the circular plate 22. A similar disengaging action occurs simultaneously at circular plate 35. The arbor 34 is then free to rotate and turns with the lock held out until a 120° arc of travel is completed and then the lock is advanced into the slot 90 by the air cylinder 100. This operation is repeated for another 120° arc of travel and then the arbor is turned back through an arc of 240° to a starting position using the valve controls VP, VC and VB.

As earlier noted, the arbor 34 in a normal starting position supports the tracer mechanism T in register with the work engaging side of the machine M and FIGS. 12 – 16, inclusive, illustrate details of the tracer mechanism T in this position. Essentially this mechanism includes an air operated tracing tool T1; pneumatic cylinder means for advancing the tracing tool into and out of contact with the work surface; and carriage means driven by an air motor for traveling the tracing tool throughout the length of the machine and back while the tool is actuated so that a scored line is traced along the work piece between desired points encompassed by the length of the machine frame.

In FIG. 15, the tracer tool T1 is shown held by spring members in a retracted position and in FIG. 16 the tracer tool is shown advanced into a working position to engage against a work surface with the holding springs indicated in an extended position.

Considering these parts in greater detail, the carriage means for the tracing tool comprises a supporting base 110 which is supported on wheel members rotatably mounted on stub shaft elements at the rear side of the supporting base 110 as viewed in FIG. 15. The wheels are more clearly shown in FIG. 21 and are denoted by numerals 111, 112, 113, and 114. Grooved outer edges of these wheels engage track portions 116 and 118 which, as shown in FIGS. 12, 13 and 14, are located on respective edges of angle iron frames 44 and 46.

Rigidly secured to the back of base 110 is a transverse carrier bar 120 (FIG. 19) which has attached at its outer end a sprocket chain 122. The sprocket chain 122 meshes with a sprocket wheel 124 driven by an air motor 132 and reduction gear means 134 supported on a bracket 133 attached to adjacent angle iron portions of the frame. At its other end, chain 122 passes around and meshes with an idler sprocket wheel 126. The sprocket wheel 126 is supported on a shaft member 136 rotatably mounted in a bearing strap 138, welded or otherwise fastened to an opposite end of the angle iron frame as is more clearly shown in FIG. 18. The air motor 132 and reduction gear means 134 are also indicated diagrammatically in FIG. 9 and operates under the control of a valve VA on panel VP through the sprocket chain 122 to move the carriage all way along the machine to a predetermined stopping point where a reverse switch is contacted and reverses the direction of travel and thereafter the carriage is returned to a starting position.

Reversing the direction of travel of the tracer mechanism as carried out by air motor 132 may be accomplished, for example, by a reversing valve such as the valve 140, best shown in FIG. 18. This valve is located on the revolving frame in the path of travel of the base 110 on which is mounted a spring loaded arm 142 as shown in FIG. 15. When valve 140 is contacted by arm 142, air motor 132 reverses the travel of chain 122. Air for valve 140 is supplied by the arbor 34 through suitable conduits. As noted above the tracer mechanism is started by actuating control button VA on panel VP. Engagement of the spring loaded arm 132 with the reversing valve 140 occurs just before the end of the travel of the carriage and the arm is yieldably supported by the spring 144 so as to provide an interval in which the reversing valve 140 may operate to reverse the travel of the carriage.

Supported at an outer side of the carriage base 110 as shown in FIGS. 15 and 16, is the pneumatically operated tracer apparatus generally denoted by the arrow T as earlier noted and including a pneumatically operated plunger which drives a tracer tool T1. The T1 essentially consists of a reciprocating cutter having a V-shaped edge. This reciprocating cutter when moved along a surface of granite is capable of cutting a continuous scored line TL as has been indicated diagrammatically in FIG. 40.

The tracer apparatus further includes a novel air conduit means supported on a reel structure on the revolving frame for supplying air to actuate the tool T1 when the carriage is travelling along the revolving frame. Also included in the tracer apparatus is a pneumatically operated parallel arm assembly for adjustably supporting the tracer air cylinder and the tracer tool T1, and moving these parts into and out of a working position so that the cutting edge will always engage a work surface at right angles thereto. As indicated in FIGS. 15, 16 and 17, the supporting parallel arm assembly comprises a pair of parallelly disposed arms 150, 152 which are pivotally mounted on fastening bolts 154 and 156, one of which is shown in FIG. 17 supported on an angle member 155, in turn welded or otherwise secured to the base 110.

Pivotal movement of the ends of arms 150 and 152 is guided by an outer holding strap 109 indicated at the left hand side of the carriage base 110 as viewed in FIGS. 15 and 16. The opposite ends of the arms 150 and 152 are maintained in their parallelly disposed relationship by means of pivot bolts 158 and 160 which are secured through a tracer-supporting block 162 as shown in FIG. 17.

A second guide strap 113 bolted to an angle iron part 113a, also shown in FIG. 17, slidably contains the arms for pivotal movement from the position shown in FIG. 15 into the position shown in FIG. 16. This pivotal movement is accomplished, for example, by means of pneumatic cylinder 170 which is anchored at its upper end to the base 110 by a bracket element 168 and which has an adjustable plunger end 167 attached to arm 152 at some convenient point.

Secured at the right hand side of tracer support block 162 as viewed in FIGS. 15 and 16, is a bracket 164 which has clamped or otherwise secured thereto the pneumatic tracer 165 and tracer tool T1. A valve member 166 controls a flow of compressed air to both the pneumatic cylinder 170 and tracer 165 from the air conduit supported on the reel structure above-noted. Coiled springs 171 and 172 anchored to the frame normally contain the arms in a raised position shown in FIG. 15. When the air cylinder 170 operates, the arms are moved against the resistance of the springs into the position of FIG. 16. When cylinder 170 stops operation with the arms in the position shown in FIG. 16, the springs retract the arms to the starting position of FIG. 15. Operation of pneumatic cylinder 170 is controlled by an operator through a valve VA on the panel VP shown in FIG. 30 through suitable air conduit means.

Figure 22:
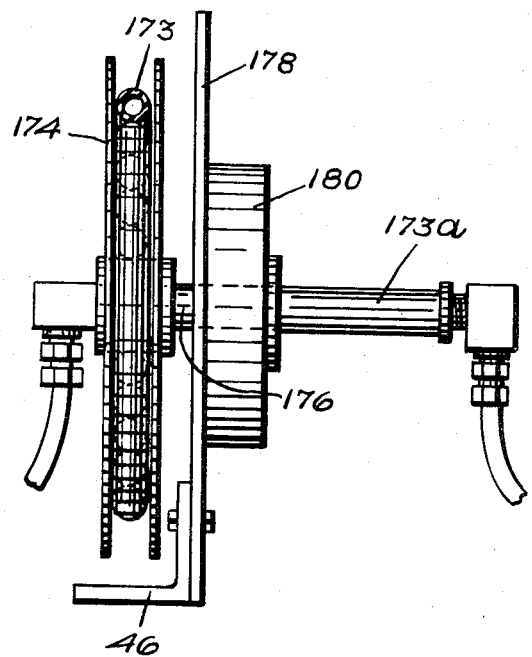
FIG. 22 is a detail view of a tracer tool reel assembly.
Figure 27:
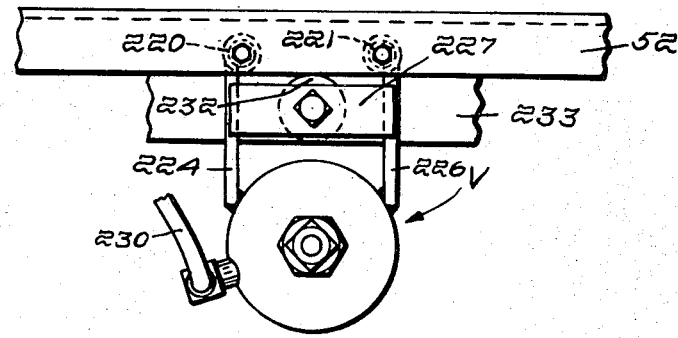
Figures 28, 29:
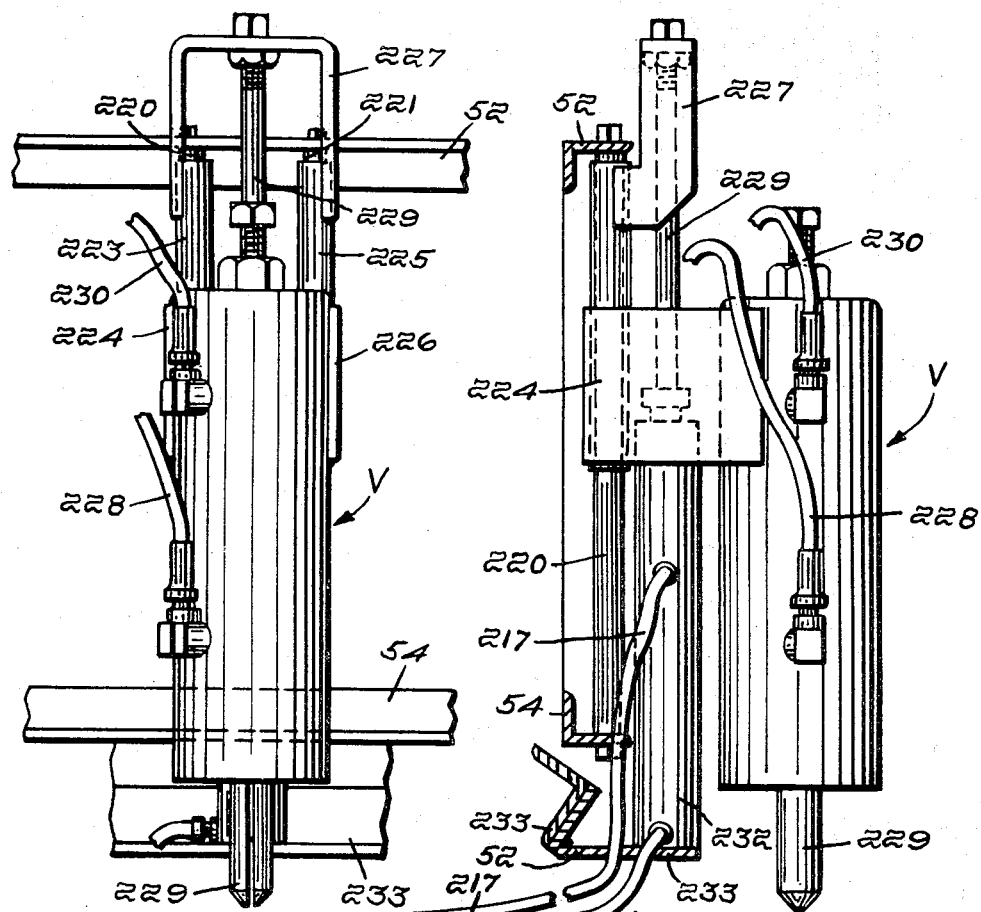

An important feature of the travelling tracer apparatus described is the reel structure 174 earlier referred to together with an extensible air conduit member 173 which is normally wound on the reel structure as shown in FIG. 22. Compressed air from the arbor 34 is led into the conduit member 173 through a tubular swivel connection 173a which is located centrally through the reel member 174 as indicated in FIG. 22.

The tubular shaft 173a may be secured in the revolving frame in some convenient manner as, for example, by means of a mounting plate 178 fastened to angle iron frame piece 46. At one side of the mounting plate 178 is a coiled spring assembly 180 which is anchored to the tubular shaft 173a and plate 178. This coiled spring assembly 180 functions to permit the flexible conduit 173 to be drawn out of the reel as the tracer mechanism T advances and when the direction of travel of the tracer mechanism is reversed, the spring retracts the flexible conduit 173 so that this conduit member is constantly maintained in a suitably wound position.

When the tracer mechanism has completed its cycle of travel and the tracer tool T1 has returned to a starting position after forming a desired line of scoring, the operator at the control panel actuates the hydraulic rotor mechanism earlier described to rotate the arbor 34 through an arc of approximately 120°. This rotative movement turns the tracer mechanism out of register with the work side of the machine and moves the drill bay and drill components of the invention into register with the work-engaging side of the machine.

In FIG. 1, the drill bay together with drill components as D, D1, D2, etc. have been generally indicated and FIGS. 24 and 25 illustrate one of the drill units indicated by reference character D and mounted between the angle iron members 48 and 50 of the revolving frame. All of the drill components may be of a conventional air operated type and are adjustably mounted in individual pneumatic holder structures. The holder structures are generally indicated in FIG. 1, and as shown in more detail in FIGS. 24 and 25 drill D is supported in drill clamps as 190, 191, 192, etc. The drill D and its pneumatic holder structure is also illustrated in FIGS. 12 – 14.

As shown in FIGS. 24 and 25, the drill D is supported in a drill clamp 190 which is attached to sleeves 193 slidably supported on guide rods 198, 198a, in turn solidly fastened between the angle iron frame parts 48 and 50. The sleeves 193 are joined together at their upper ends as viewed in FIG. 24 by U-shaped bracket means as 195, and attached to the bracket means 195 is a plunger 197. The plunger 197 is operated by a pneumatic cylinder 199 mounted in a bracket part 199a which is rigidly secured to angle iron 50. The drill D includes a pneumatically driven head, from which extends a drill element D'.

Air for actuating drill D is supplied from arbor 34 through valve 201 as illustrated most clearly in FIGS. 12 to 15, inclusive. Valve 201 is connected to manifold M6 and this valve 201 is operated by spring-loaded panel valve VF. Other drills and valves under the control of panel valve VF are similarly connected throughout the length of the machine. The drill D is moved into a drilling position by actuating valve VE which operates to supply compressed air through the manifolds M7 and M8. It will be understood that all of the other drills in the machine are moved in the same way simultaneously.

It is pointed out that when the operator at the control panel pushes spring-loaded valve VE down, the pneumatic cylinder 199 advances the plunger 197 together with the drill clamp 190 and thus positions the drill D in a position to engage against a working surface.

The drills having been lowered into a work-engaging position are operated for a period sufficient to form a series of drilled holes DH as shown in FIG. 41. The holes, for example, may have a depth of 3 inches or more. When drilling is completed the drills are retracted by releasing valve VE on the control panel. Thereafter arbor 34 controlled by the valves already described is rotated through another 120° arc of travel to position the wedge devices of the invention in the holes DH. In FIG. 35, we have illustrated a wedge bay with wedge devices as V, V1, V2, etc. appearing diagrammatically and in FIGS. 26 and 29 one of the wedge devices has been shown in more detail.

As indicated in FIGS. 26 – 29, inclusive, we provide for supporting the wedge devices on rods 220 and 221 joined to the frame and more clearly illustrated in FIG. 35. A pair of bracket members 224 and 226 are fixed to sleeve members 223 and 225, slidably supported on the rods 220 and 221, and outer bracket members 224 and 226 are welded or otherwise secured to the reciprocating wedge device V. Secured at the upper ends of the sleeves 223 and 225 is a U-shaped bracket 227 which has attached thereto a plunger rod 229, movable by a pneumatic cylinder 232, secured to a base plate 233.

A flow of hydraulic fluid into and out of the reciprocating wedge device V is furnished through manifold conduits M2 and M4 which are located along the revolving frame through holes in the triangular plate of the frame. These manifold conduits M2 and M4 are connected to a valve VG which is in turn connected to the hydraulic pump and tank mechanism 70 earlier described and located externally of the end plate 20. The hydraulic fluid, for example, oil, is supplied under pressure from manifold conduits M2 and M4 through pipe lines as for example 228 and 230 as suggested diagrammatically in FIG. 26. Other wedge devices are similarly operated at the same time. Compressed air for operating the pneumatic cylinder 232 is provided from the manifolds M9 and M10 indicated in FIG. 29, and to which are connected conduit members 217 and 219 as is also shown diagrammatically in FIG. 26.

With all of the wedge devices rotated into a position of register with the work engaging side of the machine M, the respective wedge elements are advanced into holes VH by actuating valve VG on the control panel VP which controls flow of compressed air to the pneumatic cylinder 232 from the manifold members M9 and M10 which extend throughout the length of the revolving frame. Then with valve VB having been placed in an operative position to start the oil pump 70, valve VH is opened to provide a flow of oil through conduit 230 to the wedge elements to expand the wedge element sides and to form a cleavage which is shown diagrammatically in FIG. 42. Thereafter, the wedge sides are returned to a normal contracted position by supplying oil through conduit 228 and the wedges are then retracted from the split mineral body.

A highly important feature of the method of splitting described is the manner in which the wedge devices are moved into and out of expanded positions to exert controlled wedging forces, and this is made possible by a novel wedge construction shown in more detail in FIGS. 44 – 51. In these FIGS. 44 – 51, we have illustrated details of construction of a simplified form of reciprocating wedge device V' removed from the quarry machine M. This reciprocating wedge device V' includes as principal parts thereof, a reciprocating wedge assembly, a retaining structure for holding the wedge assembly and a driver mechanism for exerting driving forces in the wedge assembly.

Numerals 302 and 304 (FIG. 44) denote wedge feathers which are more clearly shown in FIG. 48 and which are designed to have centrally disposed therebetween a wedge plug 306. The wedge plug 306 comprises a cylindrical part which is formed at one end with a pair of beveled wedge faces 306a and 306b.

Figure 47:
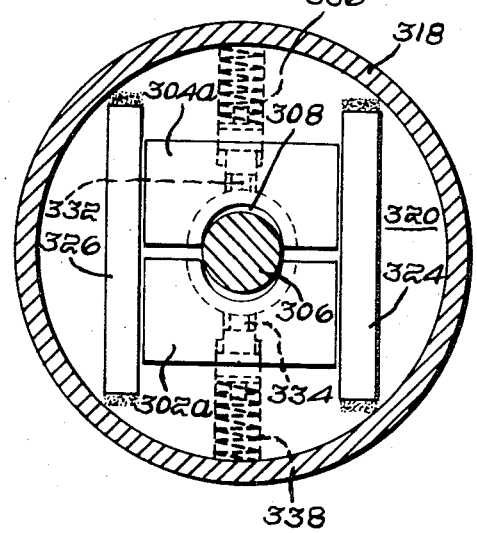
FIG. 47 is a cross-section taken on the line 47 – 47 of FIG. 45.

As will be noted from an inspection of FIG. 48, the wedge feathers 302 and 304 comprise semicylindrical tubular end sections which when placed against one another define a cylindrical opening 308 in which the cylindrical end of wedge plug 306 may be slidably received as shown in FIG. 47. Extending outwardly from the opening 308 are a pair of rectangularly shaped flanges 302a and 304a. The opposite end of the wedge feathers are conically shaped at 302b and 304b and extending away from the conically shaped ends are internal tapered liner parts 310 and 312. The parts 310 and 312 have flat tapering surfaces which are complimentary with the surfaces 306a and 306b of wedge plug 306 and these parts vary in thickness with the maximum thickness occurring at points adjacent to the conical ends 302b and 304b.

In the arrangement shown in FIGS. 48, 49 and 50, the tapered parts 310 and 312 may be secured by rivets as 314 and 316, or if desired, the two cylindrical sections 302 and 304 may be formed with the tapered ends as integral parts of the sections. It will be apparent that the tapered surface of the wedge plug 306 when advanced between the wedge feathers will engage the tapered surface of the liner parts 310 and 312 and will force the cylindrical sections 302 and 304 apart to thus exert a wedging force.

The wedge assembly components comprised by the members 302, 304 and 306 are resiliently supported against one another in a special retaining structure which includes a cylindrical housing 318 and a wedge retaining collar 320 shown in detail in FIG. 51. Located through the collar is an elliptically-shaped opening 322 which is of a size to receive therein the wedge assembly and to permit the wedge feathers to move apart when the wedge plug is forced between the feathers. At either side of the opening 322 are solidly fixed a pair of elongated stops 324 and 326. The stops 324 and 326 are spaced apart a distance such that the flanged portions 302a and 304a of the feathers 302 and 304 may be received and held against rotation as suggested in FIG. 47.

Figure 46:
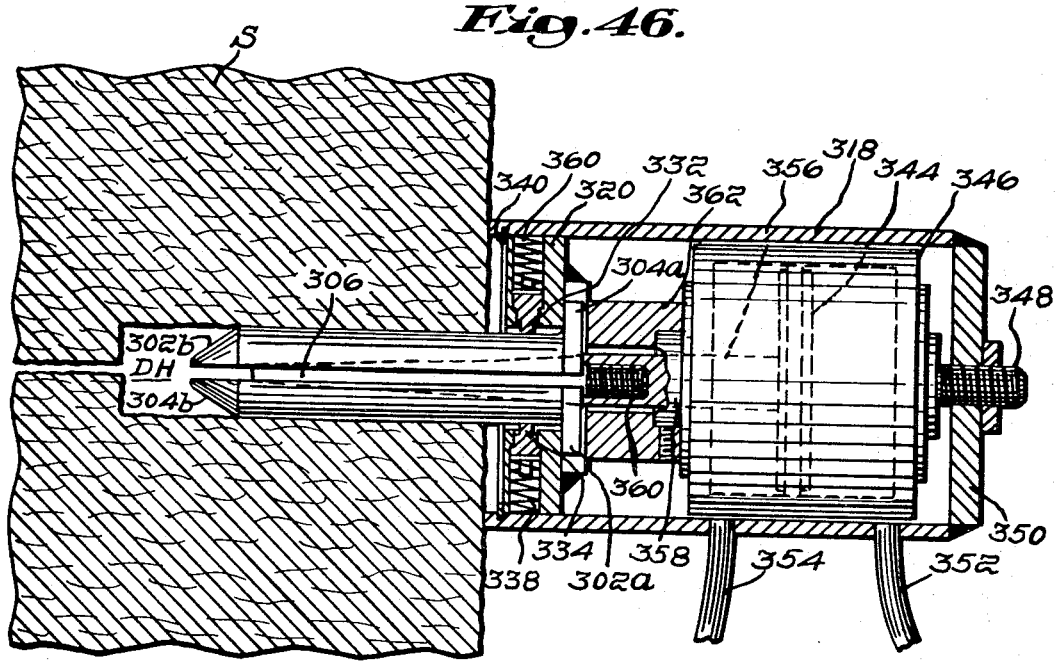
FIG. 46 is a view similar to FIG. 45 but illustrating the wedge apparatus in a position to exert wedging forces and produce a split in the rock body.

Also provided in the collar 320 are opposite radially extending openings as 330 in which are loosely received a pair of spring-loaded pins 332 and 334 which are adapted to extend through the openings 330. The inner ends of the pins 332 and 334 engage against the wedge feathers 302 and 304 as suggested in FIG. 46 and are attached to coiled springs 336 and 338 one of which is more clearly shown in FIG. 51. The coiled springs are normally held in a compressed position by engagement with the inner peripheral surface of the cylindrical housing 318 as shown in FIGS. 46 and 47. The collar 320 is also releasably held in contact with the flange portions 302a and 304a by means of a resilient lock ring 340 (FIG. 46) which is forced into a groove formed around the inner periphery of the housing as also illustrated in FIGS. 44 and 45.

In combination with the wedge assembly and its retaining structure described, we further provide a driver mechanism which is also contained in the cylindrical housing 318 and which includes a fluid power-actuated piston 344. Piston 344 is mounted for reciprocating movement in a cylinder 346 adjustably secured to the housing by a take-up screw 348 located through an end wall 350 of the housing.

Fluid pressure is exerted through a power port 352 to drive the piston in one direction and the piston is retracted by fluid flow through a return port 354.

In operation, the wedge feathers 302 and 304 are entered in the drilled hole DH with the housing engaged against the face of the drilled stone as suggested, for example, in FIGS. 45 and 46. The wedge plug 306 at this point is in a retracted position. The apparatus is positioned such that the plane of separation of the two wedge feathers 302 and 304 will coincide approximately with the desired plane of splitting. The housing and driving mechanism may be supported externally of the stone face by means of the revolving frame of machine M, earlier described.

With the wedge feathers 302 and 304 engaged as described, fluid pressure is exerted to actuate the piston 344 which starts to advance the wedge plug 306 between the wedge feathers 302 and 304. This initiates a wedging force which is continuously sustained while the intensity of the fluid pressure is increased up to a pressure of as great as 2,000 pounds, for example. This pressure acts to drive the wedge plug 306 inwardly with the wedge feathers 302 and 304 being forced apart to exert very large wedging forces. As a result of the sustained and rapidly augmented wedging forces described, there is induced a controlled splitting along a desired line or plane in a manner which is not obtainable with percussive or hammered wedging, and the degree of control and uniformity of plane of splitting through the stone body may be greatly increased and regulated by utilizing a suitable number of the wedges in spaced apart holes especially where multiple wedging forces are exerted simultaneously at separated points.

When a desired cleavage has been accomplished, fluid pressure is reversed on the piston 344 to withdraw the wedge plug 306 and thus complete reciprocating travel of the wedge plug. As this occurs, the spring loaded pins 332 and 334 act on the wedge feathers 302 and 304 to contract these wedge feathers against the wedge plug 306. All of the wedge components are thus held together and withdrawn as a compact unit which is in a convenient position to be used in another drilling operation without further handling or manipulation. This, it will be observed, is highly advantageous in dealing with vertically spaced holes since the parts do not separate, cannot fall away, and no handling is necessary.

As earlier noted all of the various machine tools now described including the tracer mechanism, the gang of drills and the corresponding gang of reciprocating wedge devices are operated from the control panel VP (FIG. 30) by a machine operator standing on a platform structure attached to the quarrying machine in close proximity to the panel as suggested for example in FIG. 1. It has also been pointed out that the machine constitutes a mobile unit which may be transported by a crane or other means to a desired location and secured adjacent to a quarry working surface as illustrated in FIGS. 1 and 4. It will also be understood that compressed air or other fluid control means may be supplied by suitable conduit means of extended length connecting the machine M with a compressor or other air supply source located at some desired point in or near the quarry area.

Figure 23:
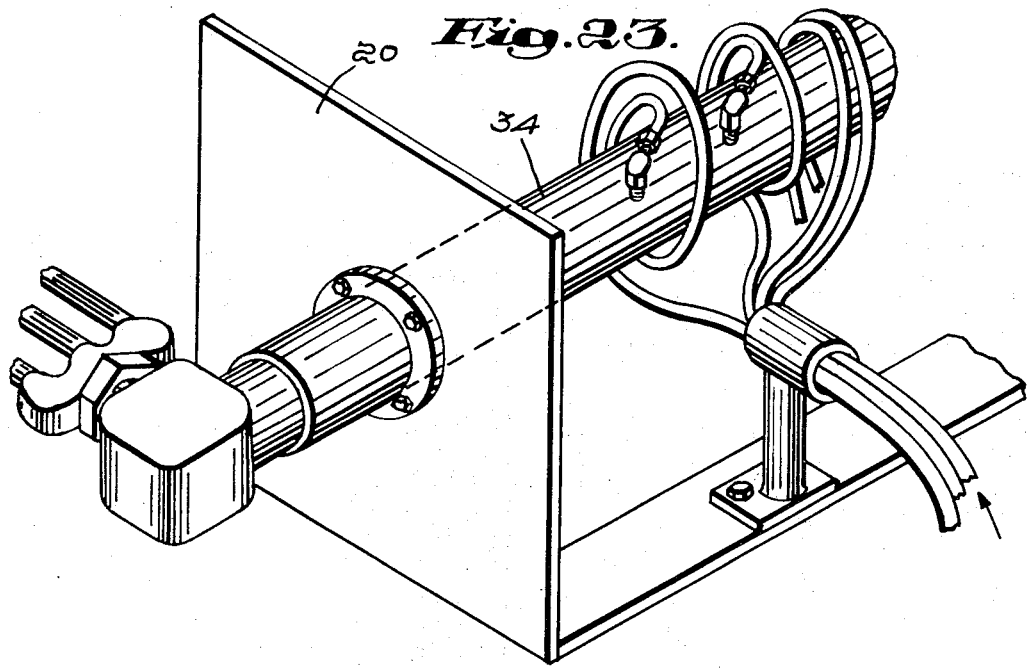
FIG. 23 is a perspective view of air conduit means for a drill unit.

In a typical gang splitting operation, the machine M, as shown in FIGS. 1 and 4, is in position to carry out a splitting operation inwardly from a vertical rock face in a substantially horizontal plane. Operation of the machine for this specific application may then proceed in the following manner. With the work engaging side of the machine constituted by the members 28 and 30 located against the vertical rock face as shown in FIGS. 1 and 4, the machine is in its normal starting position. The tracer bay is in register with the opening between the members 28 and 30 and the tracer tool T is in a retracted position. In this starting position, the arbor 34 and the manifold members, M6, M7, M8, M9 and M10 are carrying compressed air at a pressure of, for example, 100 pounds per square inch. It will be understood that all of the manifolds M6, M7, M8, M9 and M10, and others, are located around and secured to the arbor 34 and lead to various manifold locations along the machine as suggested in FIG. 23, and FIG. 23 is intended to indicate diagrammatically a plurality of conduits for supplying air to the operating panel as well as to the air motor and oil pump and to manifolds not connected into the arbor 34.

The machine operator initiates the tracing step by pressing the control button VA on the control panel VP. Control button VA operates through conventional air conduits and valve means to actuate the pneumatic cylinder 170 and to advance the tracer tool T1 into contact with the adjacent rock surface. Simultaneously control button VA operates to supply compressed air from the arbor 34 to the air motor 132 and to the tracer tool T1. The tracer carriage then moves along tracer bay with the reciprocating tracer tool T1 cutting a line of scoring TL as has been illustrated diagrammatically in FIG. 40. Movement of the tracer tool continues until spring loaded arm 142 comes into contact with reversing valve 140 and after a short interval reversing valve 140 operates to reverse air motor 132 and the carriage returns to its starting position. As the carriage reaches its original starting position, it acts through valve means to interrupt flow of compressed air to the motor and to pneumatic cylinder 170. The air motor stops and springs 170a and 170b, acting against lowered resistance of cylinder 170, returns the tracer tool T1 to a fully retracted position.

As soon as the tracer mechanism is fully retracted, the machine operator opens a valve VB which supplies air to the air motor component of the oil pump unit 70 and this oil pump starts to supply oil under pressure through the flow line shown in FIG. 31. The arbor locking mechanism earlier described is then released by opening valve VC which actuates pneumatic cylinders 100 to move locking elements 86 out of engagement with the locking plates 20 and 22, and thereafter the arbor is free to turn.

The machine operator then moves valve VD to an "up" position which provides for a flow of oil into the hydraulic rotor mechanism and the arbor 34 is rotated through an arc of 120° to move the drill bay and drill units into register with the work engaging side of the machine M. Valve VC is again operated to actuate the pneumatic cylinders 100 and engage the locking elements 86 in the next occurring slots in the locking plates 20 and 22. At this time, valve VD is moved into a non-operative position and oil pump operation is discontinued. The drills in the drill bay are then advanced into contact with the work surface by pressing button VE on the control panel. As soon as this movement is completed, the operator actuates valve VF and holds the valve in this position while the drills are actuated for a period long enough, for example, to form a three inch depth drilling. VF is then released by the operator and the drilling stops.

Valve VE is positioned "down" and the drills are retracted in their supporting frame. Compressed air for controlling these operations through the valves VE and VF is supplies from the arbor 34 and the air manifold M6 by suitable flexible tubing means and conventional control valves, as earlier described.

After drilling has been completed, the arbor is released by means of valve VC as above described and valve VD is again moved into an "up" position and the arbor 34 is rotated 120°, at which point VC is actuated to lock the arbor in this second working position. The wedges V, V1, etc. are thereafter advanced into the holes formed by the drilling elements and this movement is controlled by the operator by means of the element VG. As soon as the wedges are entered, VB is pressed to start the air motor for turning the oil pump 70 and thereafter a valve VH is moved into an "up" position to power the wedges and cause them to expand in the manner earlier described. This produces a controlled splitting or cleavage along the work surface and as soon as a desired degree of cleavage has been produced, valve VH is pushed into a "down" position to contract the wedge components in the drilled holes. Thereafter, valve VG is pushed into a "down" position to cause the wedge devices to be retracted in the wedge bay.

This machine is then ready to be returned to a starting position, and this is accomplished by the operator moving valve VC into a release position while maintaining the oil pump in operation. As soon as member VC has released the arbor, the operator pushes valve VC into a "down" position and the oil pump is reversed in directional drive and the arbor is returned through an arc of travel of 240°.

In practicing the method of the invention with gangs of drills and wedges as described, a considerable degree of selectivity may be practised. The wedge devices may be applied at varying angles, may be used simultaneously, or in some desired sequence. Controlled sequence may be especially desirable, it is found, in extending a cleavage or split in a limited or controlled manner so that the length or extent of the cleavage may be progressively regulated and controlled with the machine being moved from one horizontally disposed position to another.

It may also be desirable to vary the lengths and diameters of some of the wedge elements in a given set of wedges in use. It will be understood that in some instances, where a cleavage or fissure is already present in a rock face, the wedges may be utilized without drilling or tracing steps and likewise, it is intended that the machine may be used to split large sections of granite which have already been removed from a ledge.

A further desirable and important application of the wedging method and apparatus described is in carrying out a splitting operation that is illustrated in FIG. 5 in which the machine is supported in a vertically disposed position. As has been earlier noted, in such a procedure, a section of granite which has been split along an inwardly extending horizontal plane may be subdivided by splitting inwardly along a vertical plane to form smaller granite sections as illustrated diagrammatically in FIG. 5. In this type of machine application, changes are readily made to provide for properly securing the frame to an exposed rock body. FIG. 43 illustrates a modified form of machine in which holding arms 250 are fastened to the work-engaging side of the machine M' and a control panel VP' is mounted on a supporting platform at the upper end of the machine carried by the arms. Pins 252 are provided to engage in drilled holes in an exposed top work surface. A winch mechanism 254 may be provided to raise and lower the frame relative to the work surface.

The method of operation in this vertical positioning of the machine is generally the same as already described. The operator in some cases may stand at the top of the exposed work surface with the control panel in close proximity so that the various valve controls may be readily operated.

We have also determined that another important feature in our invention may reside in directing the multiple wedging forces in such a manner as to split along a plane which extends inwardly at an angle less than 90°. This is accomplished, for example, by controlling the extent of rotation of the wedges so as to position the wedges at some desired angle.

In this connection, there may be cited the use of the invention to carry out the function of "plugging" in which portions of the exposed part of an ore body, for example, may be split off in order to enlarge an opening or to obtain pieces of the ore occurring in some desired size.

The operation of splitting off relatively small pieces or sections of a rock mass may also be accomplished by simultaneously splitting along two planes which extend in opposed relationship to one another. In such an operation, it is contemplated that two machines may be employed to apply two sets of multiple wedging forces exerted by two sets of spaced wedging devices. In this procedure two sets of drill holes may be formed so as to extent in two converging planes and to be located in a section of rock in such a manner as to induce a break or splitting away of wedge-shaped pieces of rock of varying sizes and shapes.

In still another application of the machine with its use of multiple wedging forces exerted simultaneously, it may be desired to locate the machine in a permanently fixed position and to move sections of granite into and out of working position on a suitable conveyor member.

We claim:

1. An apparatus for splitting a mineral body comprising a tool supporting structure which includes a cage member, said cage member being formed with end walls and spaced elongated frame components which define a work-engaging side formed with an opening to provide for movement of tools into and out of engagement with a surface of the mineral body, a revolving frame rotatably mounted in the end walls of the cage member for rotative movement about a common axis which is arranged in substantially parallel spaced relationship to the said surface, said revolving frame being of triangular shape and having a central arbor and spaced tool-retaining elements which are arranged to provide a tracer bay, a drill bay, and a wedge bay, a retractable tracer mechanism supported on adjacent tool-retaining elements in the tracer bay, a plurality of retractable drill units mounted on adjacent retaining members in the drill bay, a plurality of reciprocating wedge devices adjustably supported on adjacent retaining elements in the wedge bay, and means for indexing the revolving frame into and out of positions of register with the said work-engaging side and the opening therein, and means for selectively advancing and retracting the drill units and wedge devices along paths of travel lying in one common plane which intersects the said surface of the mineral body.

2. A structure according to claim 1 in which the central arbor member extended through one of the end walls of the cage member and is of hollow construction for receiving pressurized fluids therethrough.

3. A structure according to claim 2 in which the central arbor member is provided with fluid conduits connecting with respective drill units and wedge devices for selectively actuating same.

4. A structure according to claim 3 in which the central arbor at one end is connected to a fluid pressure-pumping mechanism.

5. A structure according to claim 1 including fluid pressure conduits located around the central arbor in coiled relationship and connected to a source of compressed gas, said conduits communicating with fluid conducting lines which connect with respective tracer mechanism, drill units and wedge devices.

6. An apparatus for working a body of material presenting an exposed surface, said apparatus including a tool-supporting structure having a work-engaging side formed with an elongated opening to provide for movement of tools therethrough into engagement with the said exposed surface, an oscillatable frame, a tubular arbor rotatably mounted in the tool-supporting structure and being centrally received through the oscillatable frame, cutting tools mounted in the oscillating frame for rotative movement about a common axis which is arranged in substantially parallel spaced relationship to the said exposed surface, said cutting tools being extensible and retractable through said elongated opening along paths of travel lying in one common plane of register which intersects the exposed surface, power driving means for rotating the tubular arbor and oscillatable frame into successive working positions in the tool-supporting structure, and fluid power operated means for selectively actuating the said cutting tools when extended in any one of the said working positions.

7. A structure according to claim 8 in which the tool-supporting structure includes hanger means for supporting the tool-supporting structure in suspended relationship against a vertical surface of the material in a position to locate the cutting tools in horizontally spaced relationship to one another.

8. A structure according to claim 6 in which the tool-supporting structure includes hanger means for supporting the tool-supporting structure in suspended relationship against a vertical surface of the material in a position to locate the cutting tools in vertically spaced relationship to one another.

9. An apparatus according to claim 6 for working a body of material consisting in a rock mass presenting an exposed vertical surface and an upper horizontal surface which intersects the vertical surface, said apparatus including hanger means solidly secured to the tool-supporting structure for engaging against the said vertical surface of the rock mass, retaining bracket means fixed to the hangers substantially at right angles thereto for overlying said upper horizontal surface, and holding pin means located at the underside of the retaining bracket means for engaging in drilled holes in the said horizontal surface.

10. A structure according to claim 6, in which the tubular arbor includes circular lock plate means fixed at opposite ends of the arbor and having outer peripheral edges formed with spaced notches, arbor locking mechanism supported on the tool-supporting structure adjacent to the lock plate means, said arbor locking mechanism being movable into and out of engagement with the notches to releasably hold the oscillatable frame in each of the said working positions.

11. A structure according to claim 6, in which the tubular arbor includes circular lock plate means fixed at opposite ends of the arbor and having outer peripheral edges formed with spaced notches, arbor locking mechanism supported on the tool-supporting structure adjacent to the lock plate means, said arbor locking mechanism being movable into and out of engagement with the notches to releasably hold the oscillatable frame in each of the said working positions, and said arbor locking mechanism including a locking part slidably received in a guide element and engageable in the notches, a pivotting arm linked to the locking part, spring means for normally retaining the locking part and pivotting arm in a locking position, and fluid pressure actuated means for periodically moving the arm and locating the locking part out of engagement with the plate means.

12. A structure according to claim 6 in which the cutting tools include a tracer unit, a drill unit and a reciprocating wedge unit, said oscillating frame comprising elongated frame components arranged in a triangularly disposed manner to support each of the cutting tool units around the arbor in equally spaced relationship for movement into the said successive working positions through arcs of 120°.

13. A structure according to claim 6 in which the cutting tools include a tracer unit, a drilling unit, and a reciprocating wedge unit, and said tracing unit comprising a carriage movable along the frame, a reciprocating tracer tool in the carriage and adjustable into and out of a working position against the said surface, fluid pressure means for actuating the tracer tool while the carriage is being moved, flexible conduit means for supplying pressurized fluid, and spring loaded retracting reel means for releasably holding and retracting the flexible conduit during movement of the carriage and tracer tool.

* * * * *